US011060984B2

(12) United States Patent
Tojo

(10) Patent No.: US 11,060,984 B2
(45) Date of Patent: Jul. 13, 2021

(54) DISPENSING INSPECTION DEVICE AND DISPENSING INSPECTION METHOD

(71) Applicant: FUJIFILM Corporation, Tokyo (JP)

(72) Inventor: Yu Tojo, Minami-Ashigara (JP)

(73) Assignee: FUJIFILM Toyama Chemical Co., Ltd., Tokyo (JP)

( * ) Notice: Subject to any disclaimer, the term of this patent is extended or adjusted under 35 U.S.C. 154(b) by 373 days.

(21) Appl. No.: 16/274,516

(22) Filed: Feb. 13, 2019

(65) Prior Publication Data

US 2019/0178815 A1 Jun. 13, 2019

Related U.S. Application Data

(63) Continuation of application No. PCT/JP2017/026115, filed on Jul. 19, 2017.

(30) Foreign Application Priority Data

Aug. 17, 2016 (JP) .............................. JP2016-160020
Jun. 30, 2017 (JP) .............................. JP2017-129334

(51) Int. Cl.
*G01N 21/95* (2006.01)
*A61J 3/00* (2006.01)
(Continued)

(52) U.S. Cl.
CPC ............ *G01N 21/9508* (2013.01); *A61J 3/00* (2013.01); *B65B 5/103* (2013.01); *B65B 57/10* (2013.01); *B65B 61/24* (2013.01)

(58) Field of Classification Search
CPC ........... B65B 5/103; B65B 61/24; B65B 1/04; B65B 57/04; B65B 57/10; B65B 9/06;
(Continued)

(56) References Cited

U.S. PATENT DOCUMENTS 4,065,263 A * 12/1977 Woodbridge, III ..... B01L 3/505
422/427
RE30,010 E * 5/1979 Shanklin ............... B65B 51/303
53/552
(Continued)

FOREIGN PATENT DOCUMENTS

CN 103596540 A 2/2014
CN 104176334 A 12/2014
(Continued)

OTHER PUBLICATIONS

International Search Report for PCT/JP2017/026115, dated Oct. 10, 2017.
(Continued)

*Primary Examiner* — Dariush Seif
(74) *Attorney, Agent, or Firm* — Sughrue Mion, PLLC

(57) ABSTRACT

There are provided a dispensing inspection device and a dispensing inspection method that inspect drugs packaged in a packaging bag. The dispensing inspection device includes a transport passage that transports a packaging bag in which drugs are packaged, an imaging unit that images the drugs packaged in the packaging bag on the transport passage, a dispersion mechanism that disperses the drugs packaged in the packaging bag on the transport passage, and an inspection unit that inspects the drugs on the basis of an image of the drugs taken by the imaging unit. The dispersion mechanism includes: a column that is positioned on a side of a second surface of the packaging bag and is disposed in a direction crossing the packaging bag; a first pressing member that is positioned on a side of a first surface of the packaging bag, is disposed on an upstream side of the column in a transport direction, and presses the first surface of the packaging bag; and a second pressing member that is disposed on a downstream side of the column in the transport direction and presses the first surface of the packaging (Continued)

bag. The first and second pressing members are independently movable in a direction opposite to a pressing direction, relative positions of the column, the first pressing member, and the second pressing member are fixed, and the dispersion mechanism and the packaging bag are movable relative to each other in the transport direction.

17 Claims, 16 Drawing Sheets

(51) Int. Cl.
  *B65B 61/24* (2006.01)
  *B65B 5/10* (2006.01)
  *B65B 57/10* (2006.01)
(58) Field of Classification Search
  CPC ....... B65B 43/123; B65B 51/10; B65B 61/26;
    B65H 2301/5111; B65H 16/04; B65H
    16/103; B65H 16/026; B65H 18/10;
    B65H 23/044; B65H 23/182; B65H
    23/195; B65H 59/36; B65H 59/385;
    B65H 59/387; B65H 2403/942; B65H
    2511/112; B65H 2511/512; B65H
    2513/11; B65H 2701/1942; B65H
    2701/37; B65H 2801/69; G01N 21/9508;
    A61J 3/00
  USPC ........... 53/52, 53, 54, 494, 501, 64, 65, 167,
    53/131.2; 382/141, 143, 152, 199, 256;
    378/57
  See application file for complete search history.

(56) References Cited

U.S. PATENT DOCUMENTS

| | | | | |
|---|---|---|---|---|
| 4,160,410 A * | 7/1979 | Fichter | ................... | B65B 61/26 101/10 |
| 4,729,203 A * | 3/1988 | Astwood | ............... | B65B 43/123 53/384.1 |
| 5,115,626 A * | 5/1992 | Rutter | ...................... | B65B 9/13 53/284.7 |
| 5,279,099 A * | 1/1994 | Goodman | ............... | B65B 5/061 53/247 |
| 5,408,806 A * | 4/1995 | Lin | ........................... | B65B 9/06 493/476 |
| 5,458,062 A * | 10/1995 | Goldberg | ............. | B65H 23/046 101/226 |
| 5,607,063 A * | 3/1997 | Nishijima | ................. | B07C 3/00 209/584 |
| 5,678,393 A * | 10/1997 | Yuyama | ................... | B65B 57/14 53/493 |
| 5,839,257 A * | 11/1998 | Soderstrom | ............. | B65B 9/087 53/411 |
| 5,979,732 A * | 11/1999 | Crowley | .............. | B41J 11/0005 226/111 |
| 6,324,253 B1 * | 11/2001 | Yuyama | ................. | G01N 23/04 378/57 |
| 6,330,351 B1 * | 12/2001 | Yasunaga | ........... | G01N 21/9508 235/375 |
| 6,505,461 B1 * | 1/2003 | Yasunaga | ........... | G01N 21/9508 382/141 |
| 7,562,512 B2 * | 7/2009 | Noguchi | ............... | B65B 51/306 53/167 |
| 9,387,155 B2 * | 7/2016 | Morioka | ................ | G05B 15/02 |
| 2002/0083688 A1 * | 7/2002 | Yang | ........................ | B65B 9/06 53/550 |
| 2005/0201622 A1 * | 9/2005 | Takarada | ............. | G06K 9/6212 382/218 |
| 2006/0164647 A1 * | 7/2006 | Shibata | .................. | G01N 21/89 356/430 |
| 2006/0271237 A1 * | 11/2006 | Kim | ........................ | B65B 61/24 700/226 |
| 2007/0022715 A1 * | 2/2007 | Wegner | ................. | B65B 59/001 53/396 |
| 2007/0093370 A1 * | 4/2007 | Chiari | .................... | B65H 5/085 493/22 |
| 2009/0110322 A1 * | 4/2009 | Hadap | ....................... | G06T 7/73 382/274 |
| 2009/0173791 A1 * | 7/2009 | Pine | ......................... | G06K 9/00 235/454 |
| 2010/0085428 A1 * | 4/2010 | Kim | ....................... | G01B 11/24 348/130 |
| 2010/0170206 A1 * | 7/2010 | Kim | ........................ | B65B 61/28 53/525 |
| 2010/0202818 A1 * | 8/2010 | Fuchs | ................. | G03G 15/6564 400/619 |
| 2011/0127310 A1 * | 6/2011 | Kumazaki | ............. | B41J 15/044 226/102 |
| 2011/0252750 A1 * | 10/2011 | Koike | ..................... | B65B 9/087 53/479 |
| 2012/0012490 A1 * | 1/2012 | Brownell | .............. | B65B 61/025 206/459.5 |
| 2012/0096807 A1 * | 4/2012 | Okuma | ...................... | A61J 3/00 53/111 R |
| 2012/0200596 A1 * | 8/2012 | Gotou | ....................... | B07C 5/38 345/625 |
| 2013/0277487 A1 * | 10/2013 | Ohmura | ............. | B65H 23/1888 242/419.8 |
| 2013/0282159 A1 * | 10/2013 | Morioka | ................ | G05B 15/02 700/109 |
| 2013/0342676 A1 * | 12/2013 | Amano | ................... | B65B 57/10 348/86 |
| 2015/0178674 A1 * | 6/2015 | Yonaha | .................... | G06K 9/20 705/2 |
| 2015/0266604 A1 * | 9/2015 | Amano | ................... | B65B 45/00 53/65 |
| 2016/0104277 A1 * | 4/2016 | Takamori | ............. | G06K 9/6215 382/128 |
| 2016/0128903 A1 * | 5/2016 | Uetake | .................... | B65B 51/16 206/531 |

FOREIGN PATENT DOCUMENTS

| | | | |
|---|---|---|---|
| JP | 9-299448 A | 11/1997 |
| JP | 2000135268 A | 5/2000 |
| JP | 2004269008 A | 9/2004 |
| JP | 2012000440 A | 1/2012 |
| JP | 2014236829 A | 12/2014 |
| JP | 6093655 B2 | 3/2017 |
| WO | 2005017814 A1 | 2/2005 |
| WO | 2012081261 A1 | 6/2012 |

OTHER PUBLICATIONS

International Preliminary Report on Patentability and Translation of Written Opinion, dated Feb. 19, 2019 from the International Bureau in counterpart International application No. PCT/JP2017/026115.
Communication dated Dec. 3, 2020, from The China National Intellectual Property Administration in Application No. 201780044002. 2.
Communication dated Jun. 25, 2019, from the Japanese Patent Office in counterpart application No. 2017-129334.
Communication dated May 23, 2019, from the European Patent Office in counterpart application No. 17841328.2.

* cited by examiner

DISPENSING INSPECTION DEVICE AND DISPENSING INSPECTION METHOD

CROSS-REFERENCE TO RELATED APPLICATIONS

The present application is a Continuation of PCT International Application No. PCT/JP2017/026115 filed on Jul. 19, 2017 claiming priorities under 35 U.S.C § 119(a) to Japanese Patent Application No. 2016-160020 filed on Aug. 17, 2016 and Japanese Patent Application No. 2017-129334 filed on Jun. 30, 2017. Each of the above applications is hereby expressly incorporated by reference, in their entirety, into the present application.

BACKGROUND OF THE INVENTION

1. Field of the Invention

The present invention relates to a dispensing inspection device and a dispensing inspection method that inspect drugs to be packaged in a packaging bag.

2. Description of the Related Art

In recent years, one-package dispensing for packaging a plurality of kinds of drugs (pills, capsules, and the like) of one dose in one packaging bag has been generally performed in a case where a plurality of kinds of drugs of which, for example, medicine-taking times (for example, after breakfast, after lunch, after dinner, and the like) are different from each other are to be prescribed for a patient in a hospital or the like. After a pharmacist sets the respective drugs, which are picked according to a prescription, on trays (referred to as tablet cases) of a packaging machine for each dose, the drugs set in the trays are automatically packaged in the respective packaging bags by the packaging machine, so that the one-package dispensing is performed. In the one-package dispensing, there is a case where a pharmacist performs the picking of the drugs and the setting of the drugs in the trays with hands. For this reason, there is a concern that drugs of which the number is different from an order on the prescription may be incorrectly packaged. Further, there is a concern that drugs may fall outside without being put in the packaging bag in a case in which drugs corresponding to each package are to be put in the packaging bag by the packaging machine. Accordingly, there is proposed a technique that uses an imaging device to determine whether or not drugs to be packaged in a packaging bag are correctly packaged according to a prescription.

Further, in a case where the drugs overlap each other at the time of imaging of the drugs packaged in the packaging bag, it is difficult to accurately image the drugs packaged in the packaging bag. For this reason, there is a case where whether or not the drugs are correctly packaged according to a prescription is not accurately determined. Accordingly, there is proposed a technique that disperses the drugs packaged in the packaging bag.

JP2014-236829A discloses a dispensing inspection device that includes a dispersion arm to efficiently disperse drugs packaged in a packaging bag. The dispersion arm is provided at a position where a packaging bag placed on a transport passage of the dispensing inspection device is to be imaged, and is displaced by coming into contact with the lower surface of the packaging bag.

SUMMARY OF THE INVENTION

However, there is a case where the drugs packaged in the packaging bag cannot be sufficiently dispersed in a case where the dispersion arm is merely displaced by coming into contact with the lower surface of the packaging bag as in the technique disclosed in JP2014-236829A. As a result, there is a case where whether or not the drugs are packaged in the packaging bag according to a prescription is not accurately determined.

The invention has been made in consideration of the above-mentioned circumstances, and an object of the invention is to provide a dispensing inspection device and a dispensing inspection method that can determine whether or not drugs are packaged in a packaging bag according to a prescription.

A dispensing inspection device according to a first aspect includes a transport passage that transports a packaging bag in which drugs are packaged, an imaging unit that images the drugs packaged in the packaging bag on the transport passage, a dispersion mechanism that disperses the drugs packaged in the packaging bag on the transport passage, and an inspection unit that inspects the drugs on the basis of an image of the drugs taken by the imaging unit. The dispersion mechanism includes: a column that is positioned on a side of a second surface of the packaging bag and is disposed in a direction crossing the packaging bag; a first pressing member that is positioned on a side of a first surface of the packaging bag, is disposed on an upstream side of the column in a transport direction, and presses the first surface of the packaging bag; and a second pressing member that is disposed on a downstream side of the column in the transport direction and presses the first surface of the packaging bag. The first and second pressing members are independently movable in a direction opposite to a pressing direction; relative positions of the column, the first pressing member, and the second pressing member are fixed; and the dispersion mechanism and the packaging bag are movable relative to each other in the transport direction.

Preferably, a plurality of the first pressing members and a plurality of the second pressing members are disposed.

Preferably, the first pressing member includes a first biasing member and is biased to the first surface of the packaging bag by the first biasing member, and the second pressing member includes a second biasing member and is biased to the first surface of the packaging bag by the second biasing member.

Preferably, the first pressing member includes a first wheel that is supported by a first axle and a first frame that supports the first axle to allow the first axle to be rotatable, and the second pressing member includes a second wheel that is supported by a second axle and a second frame that supports the second axle to allow the second axle to be rotatable.

Preferably, the first pressing member includes a first shaft, a first distal end member that is fixed to the first shaft, and a first coil spring that is mounted on the first shaft and presses the first distal end member, and the second pressing member includes a second shaft, a second distal end member that is fixed to the second shaft, and a second coil spring that is mounted on the second shaft and presses the second distal end member.

Preferably, the column is a spiral column.

Preferably, the column, the first pressing member, and the second pressing member are disposed at a position where the column, the first pressing member, and the second pressing member apply tension to the packaging bag.

Preferably, the imaging unit includes a first imaging unit that is disposed on the side of the first surface of the packaging bag and a second imaging unit that is disposed on the side of the second surface of the packaging bag.

Preferably, the transport passage is provided with a drive unit that moves the packaging bag.

Preferably, the dispersion mechanism and the packaging bag are capable of reciprocating relative to each other in the transport direction.

Preferably, a forward movement speed and a backward movement speed are different from each other during reciprocation.

Preferably, the backward movement speed is lower than the forward movement speed.

A dispensing inspection method according to a second aspect includes a transport step of transporting a packaging bag in which drugs are packaged on a transport passage, a dispersion step of dispersing the drugs packaged in the packaging bag on the transport passage by a dispersion mechanism, an imaging step of imaging the drugs packaged in the packaging bag on the transport passage, and an inspection step of inspecting the drugs on the basis of an image of the drugs taken in the imaging step. The dispersion mechanism includes: a column that is positioned on a side of a second surface of the packaging bag and is disposed in a direction crossing the packaging bag; a first pressing member that is positioned on a side of a first surface of the packaging bag, is disposed on an upstream side of the column in a transport direction, and presses the first surface of the packaging bag; and a second pressing member that is disposed on a downstream side of the column in the transport direction and presses the first surface of the packaging bag. The first and second pressing members are independently movable in a direction opposite to a pressing direction; relative positions of the column, the first pressing member, and the second pressing member are fixed; and the dispersion mechanism and the packaging bag are movable relative to each other in the transport direction.

In the dispensing inspection method, the column is preferably a spiral column.

In the dispensing inspection method, the dispersion mechanism and the packaging bag are capable of reciprocating relative to each other in the transport direction.

In the dispensing inspection method, a forward movement speed and a backward movement speed are different from each other during reciprocation.

In the dispensing inspection method, the backward movement speed is lower than the forward movement speed.

According to the invention, it is possible to can accurately determine whether or not drugs are packaged in a packaging bag according to a prescription.

DESCRIPTION OF THE PREFERRED EMBODIMENTS

Figure 1:
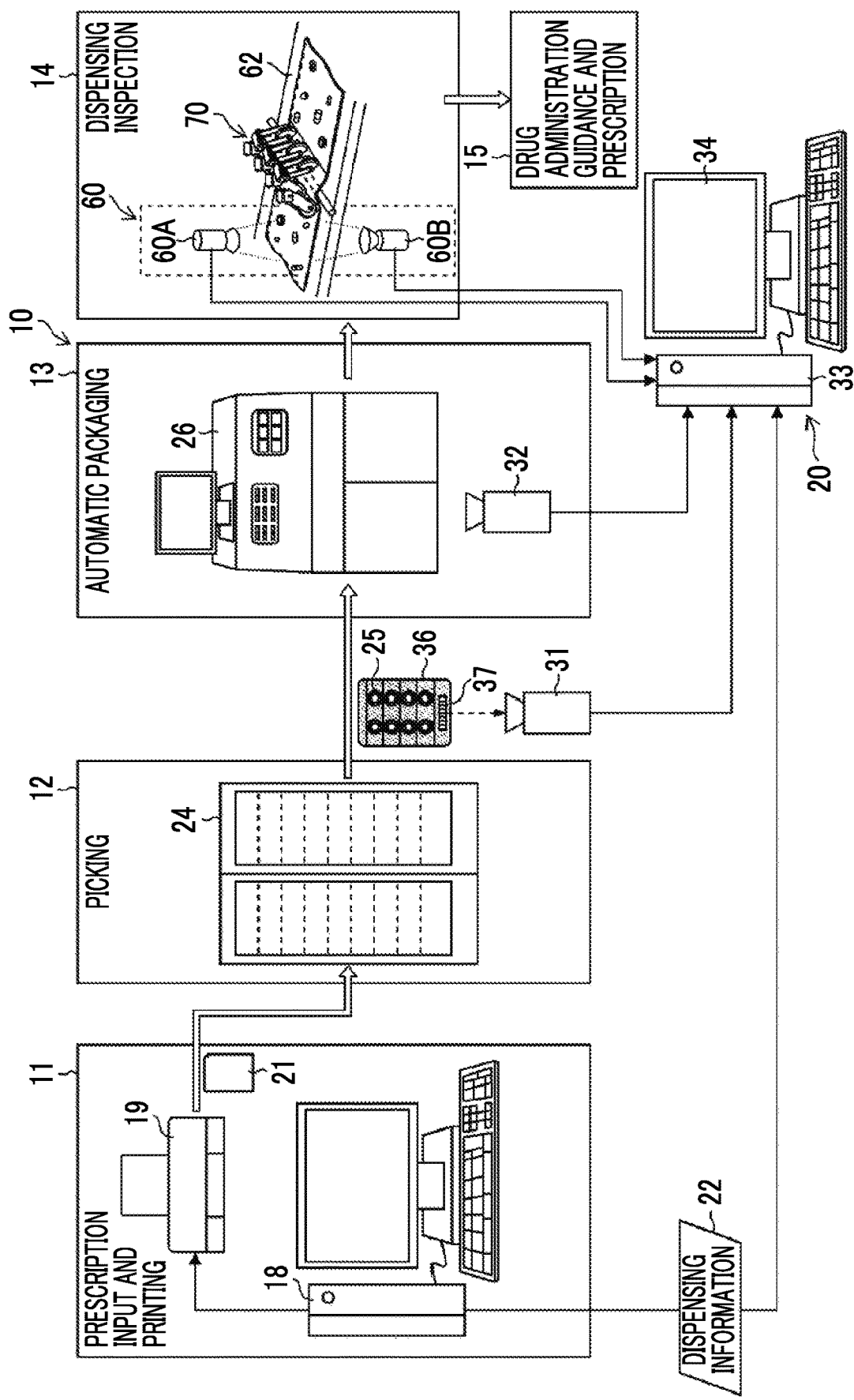
FIG. 1 is a schematic diagram showing drug prescription work.

Preferred embodiments of the invention will be described below with reference to the accompanying drawings. The invention will be described using the following preferred embodiments. The invention can be modified in various ways without departing from the scope of the invention, and embodiments other than the embodiments can be used. Accordingly, all modifications within the scope of the invention are included in the claims.

Here, components denoted in the drawings by the same reference numerals are the same components having the same functions. Further, in this specification, the numerical values of the upper limit and the lower limit shown in "~ to ~" are also included in a numerical range in a case where a numerical range is shown using "~ to ~".

[Outline of Drug Prescription Work]

FIG. 1 is a schematic diagram showing drug prescription work. As shown in FIG. 1, drug prescription work 10, which is performed at a hospital, a drugstore, or the like, mainly includes prescription input work 11, picking work 12, automatic packaging work 13, dispensing inspection work 14, and drug administration guidance and prescription work 15.

In the prescription input work 11, a pharmacist inputs dispensing information, which is written on a prescription, to a receipt computer 18. Examples of the dispensing information include the name and age of a patient, the types of drugs or the names of drugs, the amounts of drugs, how to take drugs, the dosages of drugs, and the like. The term of the type of a drug in this specification is synonymous with the class of a drug or the kind of a drug.

Then, the pharmacist operates the receipt computer 18 to print dispensing information from a printer 19 connected to the receipt computer 18. Further, the pharmacist operates the receipt computer 18 to output dispensing information 22 to a dispensing inspection device 20 from the receipt computer 18.

In the picking work 12, the pharmacist picks drugs 25, which correspond to the dispensing information 22, from a drug shelf 24 on the basis of the dispensing information 22 written on a printed matter 21 output from the printer 19. Examples of the drugs 25 include pills, capsules, and the like. For example, an automatic picking device, which automatically picks drugs on the basis of the dispensing information 22 input to the receipt computer 18, may be used in the picking work 12.

Figure 2:
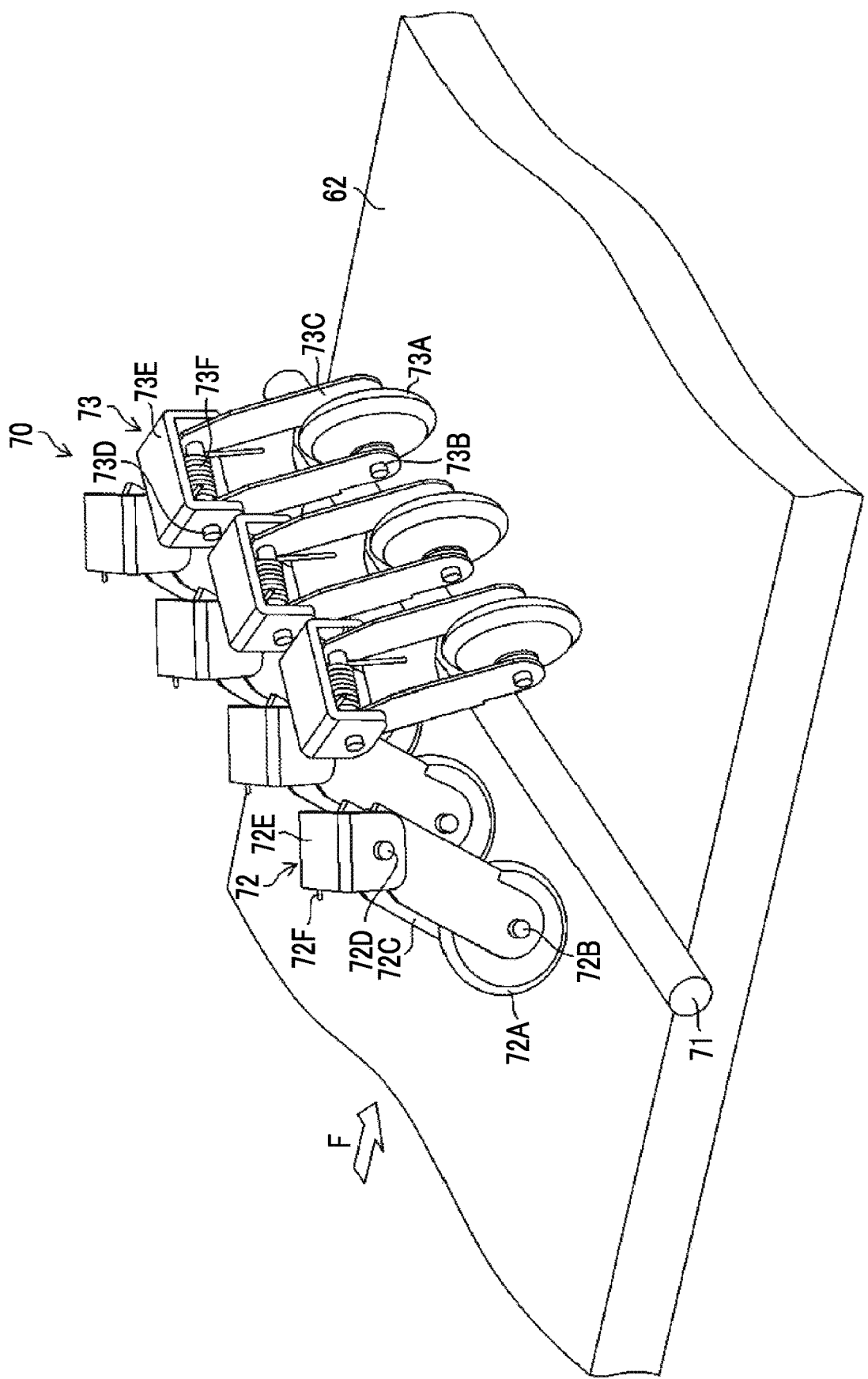
FIG. 2 is a diagram showing the structure of a first dispersion mechanism.

In the automatic packaging work 13, after the pharmacist sets the drugs 25, which are picked in the picking work 12, in trays of a packaging machine 26 for each package, the packaging machine 26 automatically packages the drugs 25, which are set in the trays, in a plurality of packaging bags 27 (see FIG. 2). Since the packaging machine 26 is publicly known, the specific description of the structure of the packaging machine 26 will be omitted.

In the dispensing inspection work 14, a dispensing inspection device to be described later is used to perform dispensing inspection for confirming whether or not the types and the number of the drugs 25 packaged in the packaging bags 27 are correct, that is, whether or not the types and the number of the drugs 25 packaged in the packaging bags 27 correspond to the dispensing information 22.

In the drug administration guidance and the prescription work 15, the pharmacist gives the drug administration guidance to a patient and prescribes the packaged drugs 25 after the dispensing inspection.

[Configuration of Dispensing Inspection Device]

In the drug prescription work 10, the dispensing inspection device 20 is used to determine whether or not the drugs 25 packaged in each packaging bag 27 by the packaging machine 26 are correct. Here, determining whether or not the drugs 25 are correct is to determine whether or not the types and the number of one or more kinds of drugs 25 packaged in each packaging bag 27 are correct to correspond to the dispensing information 22, whether or not there is a possibility that the types and the number of the drugs 25 are not correct, or whether or not the types and the number of the drugs 25 are incorrect.

The dispensing inspection device 20 of this embodiment comprises an imaging unit 60 that images the drugs 25 packaged in the packaging bags 27, an inspection device body 33, a display unit 34, a transport passage 62 that transports the packaged packaging bags 27, and a dispersion mechanism 70 that is used to disperse the drugs 25 of the packaging bags 27. In this embodiment, the imaging unit 60 includes a first camera 60A and a second camera 60B. The structure of the imaging unit 60 is not limited.

For example, the packaging machine 26 and the transport passage 62 can be arranged successively. Each packaging bag 27, which is discharged from the packaging machine 26, is transported to an imaging position, where the first and second cameras 60A and 60B are provided, by the transport passage 62. It is preferable that the packaging bags 27 discharged from the packaging machine 26 have the shape of a strap where a plurality of packaging bags 27 are continued with perforated lines therebetween. The dispensing inspection can be successively performed. The arrangement of the transport passage 62 and the packaging machine 26 is not limited to the arrangement where the transport passage 62 and the packaging machine 26 are arranged successively. For example, the packaging bags 27 discharged from the packaging machine 26 may be stored in a storage box or the like (not shown) and may be supplied to the transport passage 62 from the storage box.

In this embodiment, the transport passage 62 is substantially horizontally disposed at the imaging position. At the imaging position, the first camera 60A images the drugs 25 of the packaging bag 27 from the side of a first surface of the packaging bag 27 and the second camera 60B images the drugs 25 of the packaging bag 27 from the side of a second surface of the packaging bag 27. The first surface of the packaging bag 27 means the surface opposite to the surface of the packaging bag 27 placed on the transport passage 62, and the second surface of the packaging bag 27 means the surface of the packaging bag 27 placed on the transport passage 62.

The first and second cameras 60A and 60B image the packaged drugs corresponding to each package. That is, the first and second cameras 60A and 60B image the drugs 25, which are packaged in the packaging bag 27 from both surfaces of the transparent packaging bag 27, and acquires the image data of the drugs packaged in the packaging bag 27.

The imaging unit 60 of the dispensing inspection device 20 of this embodiment comprises the first camera 60A as a first imaging unit and comprises the second camera 60B as a second imaging unit. Since at least a part of the transport passage 62 is formed so as to transmit light, both surfaces of the drugs 25 can be imaged by the first and second cameras 60A and 60B. However, the imaging unit 60 does not need to comprise both the first and second cameras 60A and 60B, and may include any one of the first and second cameras 60A and 60B. The imaging unit 60 has a function to acquire the image data of a subject, and an imaging system is not limited to a charge-coupled device (CCD) image sensor, a complementary metal oxide semiconductor (CMOS) image sensor, and the like.

The dispensing inspection device 20 of this embodiment comprises the dispersion mechanism 70 that is used to disperse the drugs 25 of the packaging bag 27 prior to the imaging of the drugs 25 of the packaging bag 27. The dispersion mechanism 70 can disperse the drugs 25, that is, eliminate the overlapping of the drugs 25 packaged in the packaging bag 27, or can change the postures of the drugs 25, which stand up in the packaging bag 27, to a stable state where the drugs 25 are laid sideways.

Since the drugs 25 packaged in the packaging bag 27 are dispersed, the shapes, such as contours, of the drugs 25 and the identification codes provided on the drugs 25 can be accurately imaged by the first and second cameras 60A and 60B. Since the drugs 25 are accurately imaged, it is possible to accurately determine whether or not the drugs 25 are packaged in the packaging bag 27 according to a prescription by the inspection device body 33 functioning as an inspection unit.

The dispensing inspection device 20 can comprise the following components. A third camera 31 of the dispensing inspection device 20 images drug type information 37 that is recorded on a package 36 of the drugs 25 picked by the pharmacist. Examples of the package 36 include a press through package (PTP) sheet, a bottle, and the like.

The drug type information 37 is information representing drug types that are the kinds of drugs. Characters or a two-dimensional code, such as a bar code, can be applied as the drug type information 37. The characters, which are mentioned here, include components of character information, such as numerals, alphabets, signs, or a combination thereof.

In a case where the drug type information 37 is a bar code or a two-dimensional code, a reader for reading the bar code or the two-dimensional code is used together with the third camera 31.

An aspect, which comprises a fourth camera 32 shown in FIG. 1, can also be provided. The fourth camera 32 images drugs that are not packaged yet and correspond to each package. For example, the fourth camera 32 images drugs that are set in the trays of the packaging machine 26 and correspond to each package, and acquires the image data of the drugs that are set in the trays of the packaging machine 26 and correspond to each package. The fourth camera 32 shown in FIG. 1 is disposed separately from the packaging machine 26, but the fourth camera 32 may be provided in the packaging machine 26.

A personal computer can be applied as the inspection device body 33. The inspection device body 33 is connected to the receipt computer 18, the first camera 60A, the second camera 60B, the third camera 31, and the fourth camera 32 so as to be capable of performing data communication. The connection of the inspection device body 33 to the receipt computer 18, the first camera 60A, the second camera 60B, the third camera 31, and the fourth camera 32 may be wire connection or may be wireless connection. Further, the inspection device body 33 may be connected to the receipt computer 18, the first camera 60A, the second camera 60B, the third camera 31, and the fourth camera 32 through a network.

That is, the inspection device body 33 comprises a data input unit to which data sent from the receipt computer 18 is input. The dispensing information 22 is an example of the data that is sent from the receipt computer 18.

The inspection device body 33 determines whether or not the drugs 25 packaged in each packaging bag 27 are correct on the basis of the dispensing information 22 that is input from the receipt computer 18 and the image data that is obtained by the imaging unit 60 (the first and second cameras 60A and 60B).

The inspection device body 33 is connected to the display unit 34. In a case where it is determined that the drugs 25 packaged in the packaging bag 27 are not correct, the display unit 34 displays a determination result showing that the drugs 25 packaged in the packaging bag 27 are not correct. In a case where it is determined that the drugs 25 packaged in the packaging bag 27 are correct, the display unit 34 displays a determination result showing that the drugs 25 packaged in the packaging bag 27 are correct. A monitor of the packaging machine 26 may be applied as the display unit 34.

The inspection device body 33 is provided separately from the packaging machine 26 in FIG. 1, but a computer of the packaging machine may be applied as the inspection device body 33.

The display unit 34 displays the determination result that is input from the inspection device body 33. The dispensing inspection device 20 shown in FIG. 1 is an aspect of a dispensing inspection device, and the dispensing inspection device is not limited to the dispensing inspection device 20 shown in FIG. 1.

[Dispersion Mechanism]

FIG. 2 is a diagram showing the structure of the first dispersion mechanism 70 included in the dispensing inspection device 20. The dispersion mechanism 70 comprises a column 71 that is disposed in a direction crossing the packaging bag 27, a plurality of first pressing members 72 that are disposed upstream of the column 71 in a transport direction and are pressed against the first surface 27A of the packaging bag 27, and a plurality of second pressing members 73 that are disposed downstream of the column 71 in the transport direction and are pressed against the first surface 27A of the packaging bag 27. The dispersion mechanism 70 is disposed on the transport passage 62 that transports the packaging bags. The plurality of first pressing members 72 and the plurality of second pressing members 73 are disposed in this embodiment, but one or more first pressing members 72 and one or more second pressing members 73 have only to be disposed.

"Upstream" and "downstream" are terms that are used in regard to the transport direction F of the packaging bag, a case where an object is positioned on one side to which the object is to be transported in a transport direction from a certain reference is defined as "downstream", and a case where an object is positioned on the side opposite to one side to which the object is to be transported in the transport direction F is defined as "upstream".

In this embodiment, the column 71 has a columnar shape. The shape of the cross-section of the column 71 perpendicular to a longitudinal direction may be the shape of a closed curve, such as an ellipse, or may be a polygonal shape, such as a triangular shape or a quadrangular shape. The size of the cross-section of the column 71 perpendicular to the longitudinal direction is appropriately determined according to the sizes of the drugs 25 packaged in the packaging bag 27. In this embodiment, the column 71 is disposed at a position perpendicular to the transport direction F.

It is preferable that the length of the column 71 is larger than the width of the packaging bag 27 passing through the transport passage 62.

In this embodiment, the first and second pressing members 72 and 73 have the same structure. The structure of the first and second pressing members 72 and 73 will be described on the basis of the second pressing member 73. Each second pressing member 73 comprises a second wheel 73A that is pressed against the first surface 27A of the packaging bag 27, a second axle 73B that supports the second wheel 73A, a pair of second frames 73C that supports the second axle 73B to allow the second axle 73B to be rotatable, and a second fixing part 73E that supports a second shaft 73D of the second frames 73C to allow the second shaft 73D to be rotatable. In this embodiment, the second frames 73C, which include the second wheel 73A, are biased to the first surface 27A of the packaging bag 27 (not shown) by a second spring 73F that is a second biasing member provided in the second fixing part 73E. Each second pressing member 73 is pressed against the first surface 27A of the packaging bag 27 by the second spring 73F that is a biasing member in this embodiment, but is not limited thereto. For example, each second pressing member 73 can be pressed against the first surface 27A of the packaging bag 27 by gravity.

As in the second pressing member 73, each first pressing member 72 comprises a first wheel 72A that is pressed against the first surface 27A of the packaging bag 27, a first axle 72B that supports the first wheel 72A, a pair of first frames 72C that supports the first axle 72B, a first fixing part 72E that supports a first shaft 72D of the first frames 72C to allow the first shaft 72D to be rotatable, and a first spring 72F that is a first biasing member provided in the first fixing part 72E. Each of the wheels (first and second wheels 72A and 73A) means a member that is rotated about a shaft, and the shape of the wheel is not limited as long as the wheel is rotatable.

It is preferable that an angle (toe angle) between the second wheel 73A and the transport direction F is in the range of, for example, 15° to 30°. In a case where the second wheel 73A and the transport direction F are parallel to each other, the toe angle is 0°. In a case where the second wheel 73A and the transport direction F are orthogonal to each other, the toe angle is 90°.

The toe angles of the second wheels 73A of the respective second pressing members 73 can be set to the same direction and the same angle, or can be set to angles different from each other.

The second wheels 73A of the second pressing members 73 are disposed so that the lower ends of the second wheels 73A are positioned at the lowest point by the second springs 73F and are disposed at positions where the lower ends of the second wheels 73A come into contact with the drugs 25 packaged in the packaging bag 27 at the lowest point.

Since the second shafts 73D of the second frames 73C are rotatably supported by the second fixing parts 73E, the second wheels 73A are adapted to be movable in a direction, where the second wheels 73A are separated from the transport passage 62, against the biasing forces of the second springs 73F. The second wheels 73A of the respective second pressing members 73 are adapted to be independently movable in a direction opposite to a pressing direction.

Since the second wheels 73A are biased by the second springs 73F, the second wheels 73A can be moved against the biasing forces of the second springs 73F in a direction opposite to the pressing direction and can go over the drugs 25 in a case where the second wheels 73A pass by the drugs 25. Accordingly, it is possible to avoid damage to the drugs 25. Since the directions of the second wheels 73A, that is, the toe angles are fixed, the directions of the drugs 25 packaged in the packaging bag 27 can be changed in a case where the second wheels 73A pass by the drugs 25.

The first and second pressing members 72 and 73 have the same structure as described above. However, the number of the first pressing members 72 (four) and the number of the second pressing members 73 (three) can be made to be different from each other as shown in this embodiment, or can be set to be equal to each other.

The directions and the toe angles of the first and second wheels 72A and 73A of the first and second pressing members 72 and 73 can be appropriately determined. The first and second wheels 72A and 73A are inclined in different directions with respect to the transport direction F in this embodiment, but are not limited thereto.

The pressing members (including the first pressing members 72 and the second pressing members 73) mean members that are inclined with respect to the transport direction F of the transport passage and are disposed at positions where the members can come into contact with the drugs packaged in the packaging bag. Accordingly, the shapes of the inclined members are not particularly limited.

Next, the operation of the first dispersion mechanism 70 will be described with reference to FIGS. 3 to 5.

Figure 3:
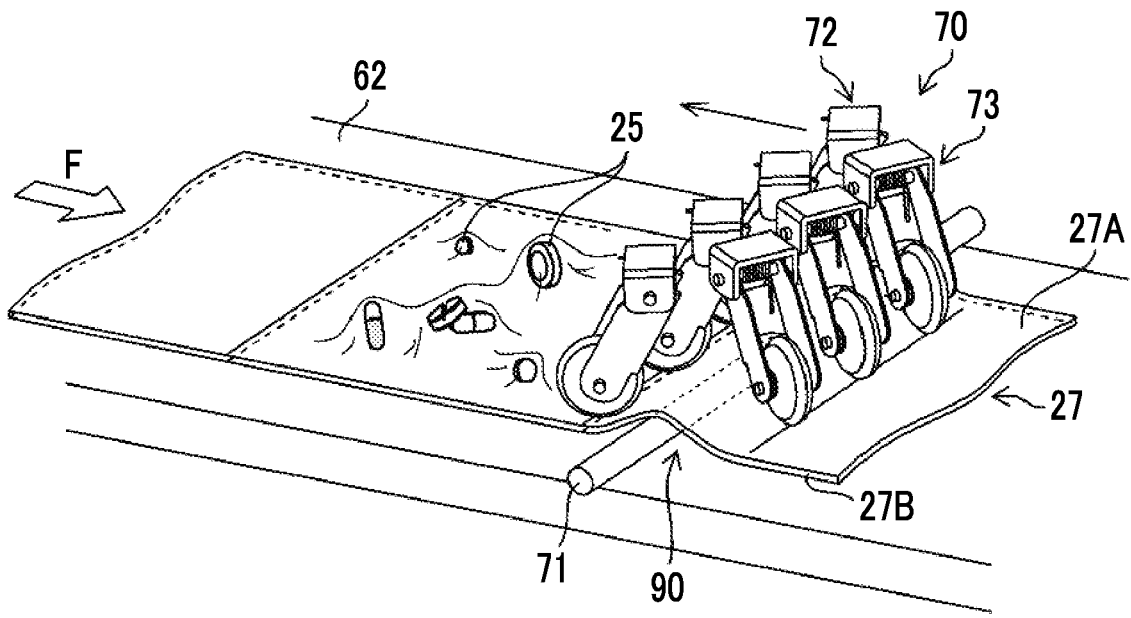
FIG. 3 is a diagram illustrating the operation of the first dispersion mechanism.

As shown in FIG. 3, the dispersion mechanism 70 stands by at a downstream position of the imaging position on the transport passage 62. The packaging bag 27 in which the drugs 25 are packaged is transported on the transport passage 62 in the transport direction F. The packaging bag 27 is temporarily stopped at the imaging position. The dispersion mechanism 70, which stands by, is adapted to be capable of reciprocating relative to the packaging bag 27, which is stopped at the imaging position, by a distance corresponding to each package. In the embodiment, the movement of the dispersion mechanism 70, which is positioned at a stand-by position, is referred to as forward movement and the movement of the dispersion mechanism 70, which is directed to the stand-by position after the forward movement, is referred to as backward movement.

The first and second pressing members 72 and 73 of the dispersion mechanism 70 are disposed on the first surface 27A of the packaging bag 27. The column 71 of the dispersion mechanism 70 is disposed between the second surface 27B of the packaging bag 27 and the transport passage 62. In this embodiment, as described above, the first surface 27A of the packaging bag 27 means the surface opposite to the surface of the packaging bag 27 placed on the transport passage 62, and the second surface 27B of the packaging bag 27 means the surface of the packaging bag 27 placed on the transport passage 62. The relative positions of the first pressing members 72, the second pressing members 73, and the column 71 of the dispersion mechanism 70 are fixed. Accordingly, the first pressing members 72, the second pressing members 73, and the column 71 can be moved to the upstream side and the downstream side in the transport direction F while maintaining predetermined distances therebetween. In addition, the first and second pressing members 72 and 73 are pressed against the first surface 27A of the packaging bag 27.

Accordingly, in a case where the dispersion mechanism 70 is moved in the transport direction F, a swell 90 can be forcibly generated on the packaging bag 27 and can be moved.

Since the first and second pressing members 72 and 73 are pressed against the first surface 27A, the movement of the packaging bag 27 can be restricted to some extent and tension can be applied to the packaging bag 27.

In this embodiment, the lower ends of the first and second wheels 72A and 73A are disposed at positions lower than the upper end of the column 71 with respect to the transport passage 62 as a reference. Since the first and second wheels 72A and 73A and the column 71 have such a positional relationship, tension can be applied to the packaging bag 27 by the first and second wheels 72A and 73A. Since the packaging bag 27 is pressed by the lower ends of the first and second wheels 72A and 73A, the movement of the packaging bag 27 can be restricted.

The transport passage 62 is provided with a drive unit (not shown) that is used to transport the packaging bags 27. A pair of nip rollers that pinches the first and second surfaces 27A and 27B of the packaging bag 27 and a motor that rotationally drives the pair of nip rollers can be exemplified as the drive unit. Tension can be applied to the packaging bag 27 by the pair of nip rollers. It is possible to transport the packaging bag 27 to both the upstream side and the downstream side by changing the driving direction of the motor.

Figure 4:
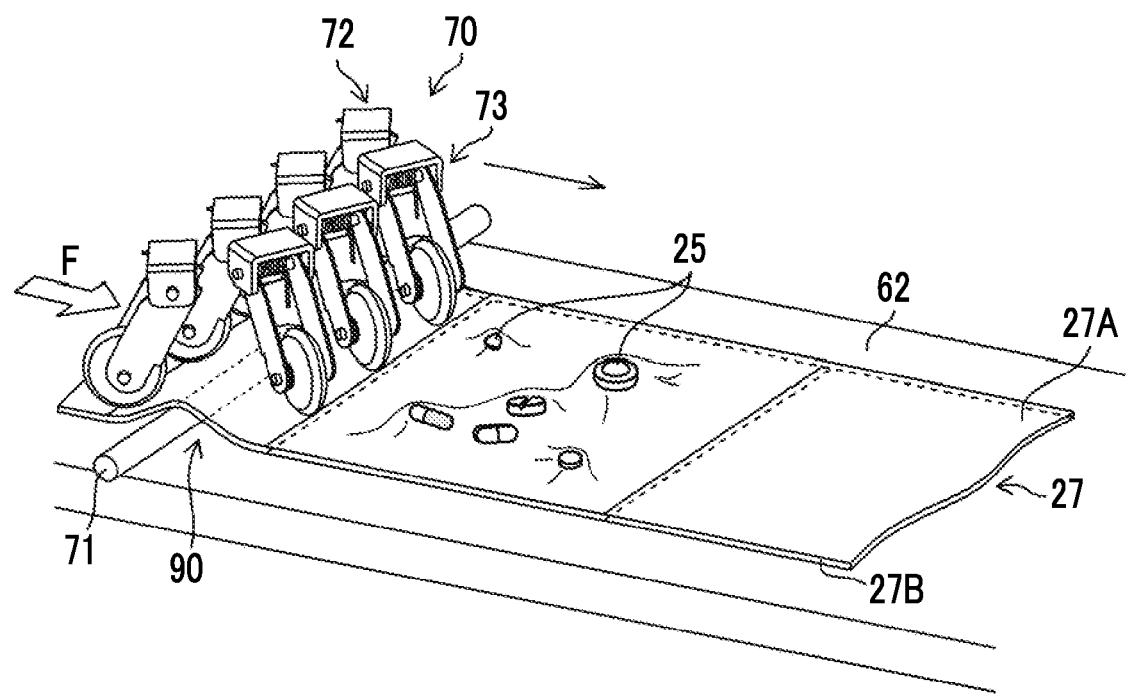
FIG. 4 is a diagram illustrating the operation of the first dispersion mechanism.

As shown in FIG. 4, the dispersion mechanism 70, which is in a stand-by state, is moved forward to the upstream side. In a case where the column 71 is moved to the upstream side along the first surface 27A of the packaging bag 27 while the packaging bag 27 is pressed by the first and second pressing members 72 and 73, the swell 90 is moved. Accordingly, the overlapping of the drugs 25 packaged in the packaging bag 27 can be eliminated or the postures of the drugs 25, which stand up in the packaging bag 27, can be changed to a stable state where the drugs 25 are laid sideways, that is, the drugs 25 can be efficiently dispersed.

The reason for this is presumed as follows: since the movement of the packaging bag 27 is restricted by the first and second pressing members 72 and 73 and tension is applied to the packaging bag 27 in a case where the column 71 passes, the drugs 25 are in a state where the drugs 25 are to be easily dispersed.

As described above, the plurality of first pressing members 72 and the plurality of second pressing members 73 can be moved upward independently. Accordingly, even in a case where the drugs 25, which pass, have different sizes in a width direction orthogonal to the transport direction F, the respective first and second pressing members 72 and 73 can disperse the drugs 25 without being affected by a difference in size. That is, since the first and second pressing members 72 and 73 can be moved independently, the first and second pressing members 72 and 73 can also press the smallest drug 25 while pressing the largest drug 25.

Further, in this embodiment, the first pressing members 72 are inclined with respect to the transport direction F as shown in FIG. 4. It is preferable that the directions of the drugs 25 are inclined with respect to the transport direction F by the first pressing members 72 in a case where the dispersion mechanism 70, which is in a stand-by state, is moved to the upstream side. In a case where the directions of the drugs 25 are changed, the drugs 25 can be easily dispersed by a swell 90. However, the first pressing members 72 do not necessarily need to be inclined with respect to the transport direction F.

Figure 5:
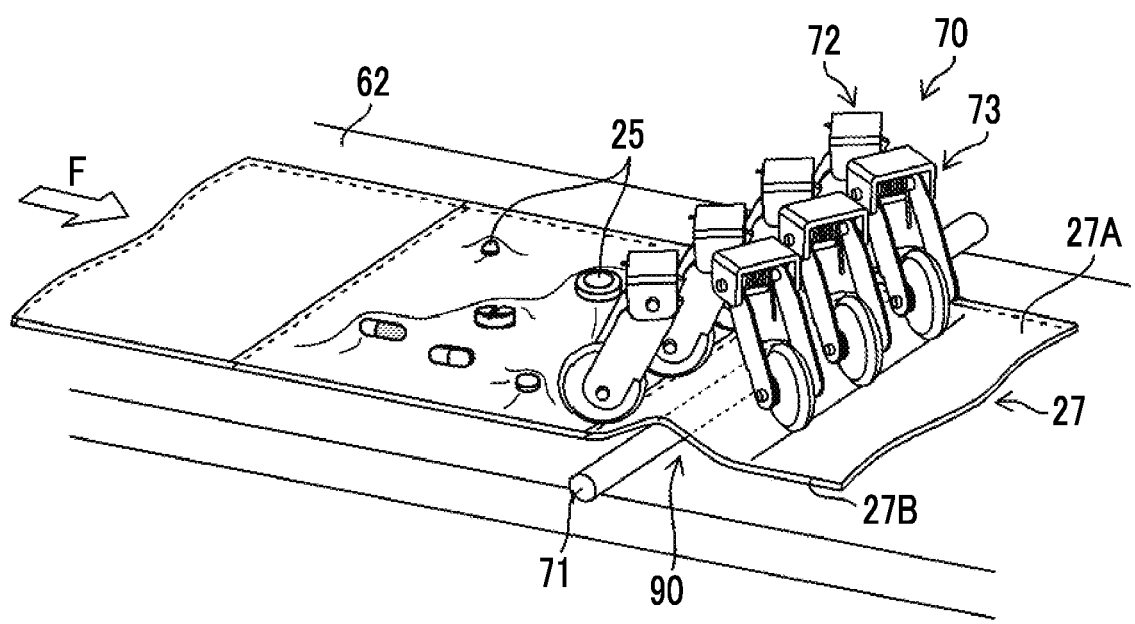
FIG. 5 is a diagram illustrating the operation of the first dispersion mechanism.

As shown in FIG. 5, the dispersion mechanism 70, which is moved forward to the upstream side by a distance corresponding to each package, is moved backward to the downstream side by a distance corresponding to each package and returns to the stand-by position. As in the description using FIG. 4, a swell 90 can be forcibly generated on the packaging bag 27 and can be moved by the dispersion mechanism 70 in a case where the dispersion mechanism 70 is moved to the downstream side.

Since the first and second pressing members 72 and 73 are pressed against the first surface 27A, the movement of the packaging bag 27 can be restricted to some extent and tension can be applied to the packaging bag 27. In a case where the column 71 is moved to the downstream side along the first surface 27A of the packaging bag 27 while the packaging bag 27 is pressed by the first and second pressing members 72 and 73, the drugs 25 can be efficiently dispersed.

Since the second pressing members 73 are inclined with respect to the transport direction F, the directions of the drugs 25 can be inclined with respect to the transport direction F by the second pressing members 73. Further, the dispersion mechanism 70 can be made to reciprocate plural times as necessary. A drive device (not shown) is mechanically connected to the dispersion mechanism 70. The operation of the drive device is controlled by a drive control unit that is provided in the inspection device body 33.

Furthermore, the packaging bag 27 can be made to be in a loose state by the control of the drive unit (not shown). In a case where the drugs 25 are to be dispersed by the dispersion mechanism 70 while the packaging bag 27 is in a loose state, the drugs 25 can be more reliably dispersed. It is presumed that there is a case where it is difficult for the drugs 25 to be dispersed due to the restriction of the movement of the drugs 25 in a case where the tension of the packaging bag 27 is excessively high.

An aspect in which the dispersion mechanism 70 is made to reciprocate relative to the packaging bag 27 that is at a stop has been described in this embodiment, but the dispersion mechanism 70 may be fixed and the packaging bag 27 may be made to reciprocate. That is, the dispersion mechanism 70 and the packaging bag 27 have only to be movable relative to each other.

The forward movement speed of the dispersion mechanism 70 and the backward movement speed of the dispersion mechanism 70 may be different from each other during the reciprocation of the dispersion mechanism 70. Objects of the dispersion mechanism 70 are to eliminate the overlapping of the drugs 25 packaged in the packaging bag 27 and to lay the drugs 25, which stand up in the packaging bag 27, sideways. It is preferable that the movement speed of the dispersion mechanism 70 may be varied according to the respective objects. For example, in a case where the overlapping of the drugs 25 is to be eliminated, a relatively strong force needs to be applied to the drugs 25. For this reason, it is preferable that the movement speed of the dispersion mechanism 70 is high. Further, if a relatively strong force is applied to drugs 25 in a case where the drugs 25 standing up are to be laid sideways, there is a concern that the drugs 25 may not be laid sideways and may go over the column 71. For this reason, it is preferable that the movement speed of the dispersion mechanism 70 is low. Here, a high movement speed and a low movement speed are determined according to the comparison of the movement speeds corresponding to the above-mentioned objects as a reference. In a case where the low movement speed is assumed as 1, it is preferable that, for example, the high movement speed is in the range of 3 to 7.

In accordance with the above-mentioned objects, for example, the forward movement speed of the dispersion mechanism 70 can be set to be low and the backward movement speed thereof can be set to be high. Further, the forward movement speed of the dispersion mechanism 70 can be set to be high and the backward movement speed thereof can be set to be low.

Since it is preferable that the drugs 25 are laid sideways before the drugs 25 are imaged, it is preferable that the forward movement speed of the dispersion mechanism 70 is set to be high to eliminate the overlapping of the drugs 25 and the backward movement speed thereof is then set to be low to lay the drugs 25 sideways.

Next, in a case where the dispersion mechanism 70 is to reciprocate plural times, examples of the movement speed of the dispersion mechanism 70 include the following aspects. If the dispersion mechanism 70 is to reciprocate three times, the forward movement speed and backward movement speed of the dispersion mechanism 70 can be set to the same speed in regard to three times of reciprocation. Further, the forward movement speeds and the backward movement speeds of two times of reciprocation and the forward movement speed of the third reciprocation can be set to the same speed, and the backward movement speed of the third reciprocation can be set to be lower than the other movement speeds. The overlapping of the drugs 25 can be eliminated, and the drugs 25 can be laid sideways. However, the reciprocation of the dispersion mechanism 70 can be appropriately changed according to an object.

Figure 6:
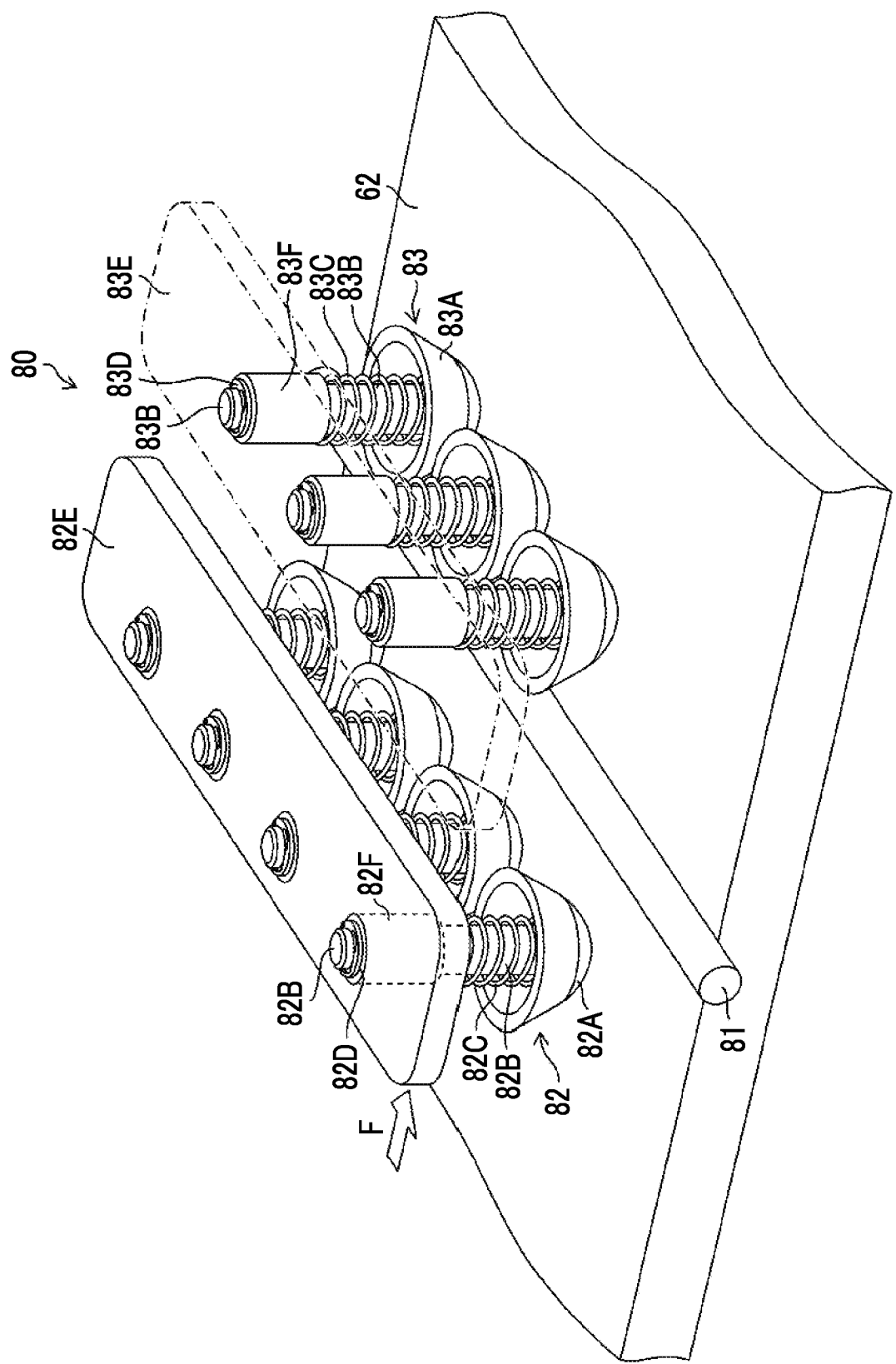
FIG. 6 is a diagram showing the structure of a second dispersion mechanism.

The dispersion mechanism 70 is n not limited to the structure of this embodiment. FIG. 6 is a diagram showing the structure of a second dispersion mechanism 80 included in the dispensing inspection device 20. The dispersion mechanism 80 comprises a column 81 that is disposed in a direction crossing the packaging bag 27 (not shown), a plurality of first pressing members 82 that are disposed upstream of the column 81 in the transport direction and are pressed against the first surface 27A of the packaging bag 27 (not shown), and a plurality of second pressing members 83 that are disposed downstream of the column 81 in the transport direction and are pressed against the first surface 27A of the packaging bag 27 (not shown).

The dispersion mechanism 80 is disposed on the transport passage 62 that transports the packaging bags. The plurality of first pressing members 82 and the plurality of second pressing members 83 are disposed in this embodiment, but one or more first pressing members 82 and one or more second pressing members 83 have only to be disposed.

In this embodiment, the first and second pressing members 82 and 83 have the same structure. The structure of the first and second pressing members 82 and 83 will be described on the basis of the second pressing member 83. Each second pressing member 83 comprises a second distal end member 83A that is pressed against the first surface 27A (not shown) of the packaging bag 27, a second shaft 83B that is fixed to the second distal end member 83A, a second coil spring 83C that is mounted on the second shaft 83B so as to be stretchable, a second ring 83D for retaining that is mounted on the side of the second shaft 83B opposite to the second distal end member 83A, a second bracket 83E in which through holes are formed, and a second sleeve 83F that is disposed in each through hole. In this embodiment, the plurality of second shafts 83B are inserted into the common second bracket 83E. The second sleeve 83F is made of a resin, and facilitates the movement of the second shaft 83B.

The second distal end member 83A is biased by the second coil spring 83C, which is a biasing member supported by the second bracket 83E, and presses the first surface 27A (not shown) of the packaging bag 27. The second distal end member 83A may be pressed against the first surface 27A (not shown) of the packaging bag 27 by gravity without the second coil spring 83C.

Since the second ring 83D is larger than the through hole of the second bracket 83E, the separation of the second shaft 83B from the second bracket 83E is suppressed.

As in the second pressing member 83, each first pressing member 82 comprises a first distal end member 82A that is pressed against the first surface 27A (not shown) of the packaging bag 27, a first shaft 82B that is fixed to the first distal end member 82A, a first coil spring 82C that is mounted on the first shaft 82B so as to be stretchable, a first ring 82D for retaining that is mounted on the side of the first shaft 82B opposite to the first distal end member 82A, a first bracket 82E in which through holes are formed, and a first sleeve 82F that is disposed in each through hole. In this embodiment, the plurality of first shafts 82B are inserted into the common first bracket 82E.

The first and second distal end members 82A and 83A have a conical shape that is tapered toward the transport passage 62, and the distal ends of the conical first and second distal end members 82A and 83A are formed in the shape of a curved surface. It is preferable that the apex angles of the first and second distal end members 82A and 83A are in the range of, for example, 60° to 120°.

The relative positions of the first pressing members 82, the second pressing members 83, and the column 81 of the dispersion mechanism 80 are fixed. Accordingly, the first pressing members 82, the second pressing members 83, and the column 81 can be moved to the upstream side and the downstream side in the transport direction F while maintaining predetermined distances therebetween. In addition, the first and second pressing members 82 and 83 are pressed against the first surface 27A (not shown) of the packaging bag 27.

The relative positions of the first pressing members 82, the second pressing members 83, and the column 81 have only to be fixed while the first pressing members 82, the second pressing members 83, and the column 81 are moved to disperse the drugs 25. Accordingly, the relative positions of the first pressing members 82, the second pressing members 83, and the column 81 can be appropriately changed according to the sizes of the drugs 25 to be dispersed before the dispersion of the drugs 25.

Accordingly, in a case where the dispersion mechanism 80 is moved in the transport direction F, a swell 90 (not shown) can be forcibly generated on the packaging bag 27 and can be moved. Since the first and second pressing members 82 and 83 are pressed against the first surface 27A, the movement of the packaging bag 27 can be restricted to some extent and tension can be applied to the packaging bag 27.

As a result, the drugs 25, which are packaged in the packaging bag 27, can be effectively dispersed by the swell 90.

The first distal end members 82A are biased by the first coil springs 82C, and the second distal end members 83A are biased by the second coil springs 83C. In a case where the first and second distal end members 82A and 83A pass by the drugs 25 (not shown), the first and second distal end members 82A and 83A can be moved against the biasing forces of the first and second coil springs 82C and 83C in a direction opposite to the pressing direction and can go over the drugs 25. Accordingly, it is possible to avoid damage to the drugs 25.

In a case where the first and second distal end members 82A and 83A pass by the drugs 25, the directions of the drugs 25 packaged in the packaging bag 27 can be changed by the inclined surfaces of the conical first and second distal end members 82A and 83A or the curved surfaces of the distal ends thereof. Since the directions of the drugs 25 are changed, it is possible to make the drugs 25 be in a state where the drugs 25 are to be easily dispersed. However, the first and second distal end members 82A and 83A are not limited to a conical shape.

In addition, plate-like members can also be applied as the first and second pressing members of the dispersion mechanism. The structure of the dispersion mechanism can be simplified in a case where the plate-like members are applied.

Figure 7:
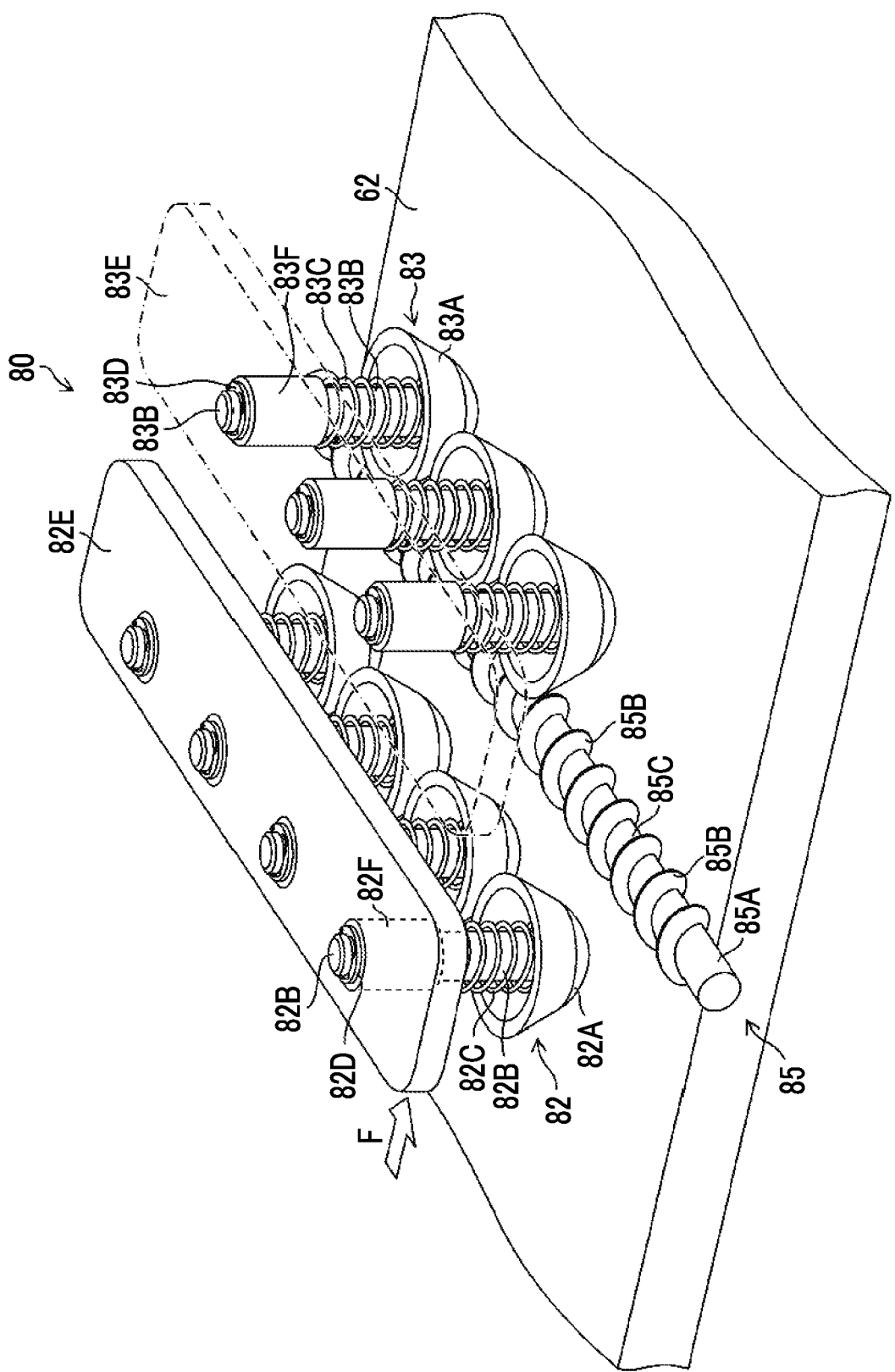
FIG. 7 is a diagram showing the structure of a modification example of the second dispersion mechanism.

FIG. 7 is a diagram showing the structure of a modification example of the second dispersion mechanism 80 included in the dispensing inspection device 20. As shown in FIG. 7, the second dispersion mechanism 80 comprises a spiral column 85 instead of the column 81. The spiral column 85 includes a column 85A and a spiral blade 85B that is provided on the outer peripheral surface of the column 85A. A spiral groove 85C is formed on the outer peripheral surface of the column 85A by the spiral blade 85B.

The spiral column 85 is connected to a drive unit (not shown), and can be rotated in the same direction as the transport direction F or a direction opposite to the transport direction F. The spiral column 85 can be rotated independently of the movement of the dispersion mechanism 80. The spiral column 85 can facilitate laying the drugs 25, which stands up, sideways during the movement of the dispersion mechanism 80.

Figure 8:
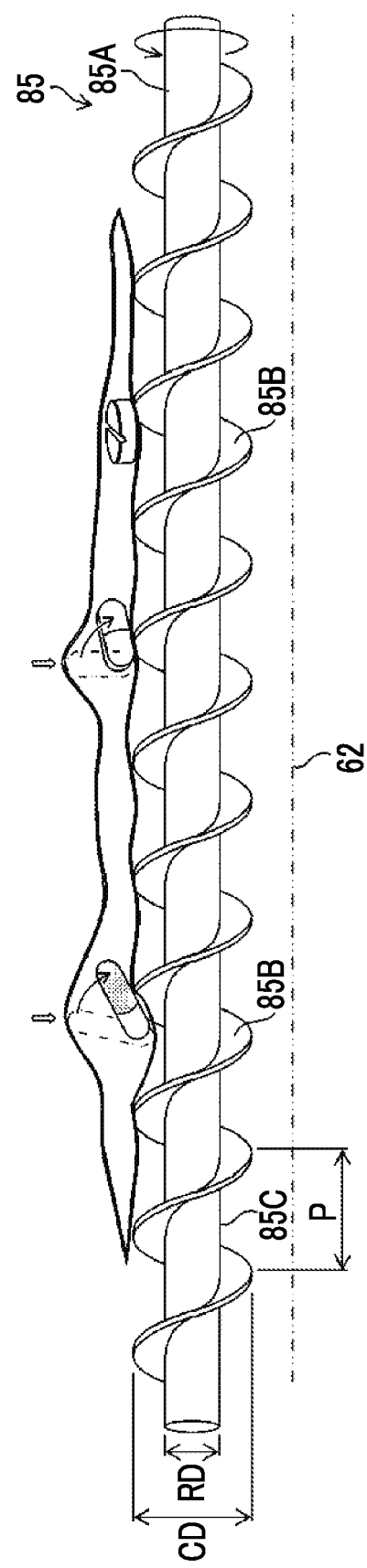
FIG. 8 is a diagram illustrating the operation of a spiral column.

FIG. 8 is a diagram illustrating the operation of the spiral column 85. The spiral column 85 passes between the packaging bag 27 and the transport passage 62 as shown in FIG. 8 in a case where the dispersion mechanism 80 (not shown) is moved. In this case, the plurality of drugs 25, which are packaged in the packaging bag 27, go over the spiral column 85. Since the spiral column 85 is rotated, the drugs 25 are subjected to a force parallel to the axial direction of the column 85A by the spiral blade 85B. As a result, the spiral column 85 can facilitate laying the drugs 25 sideways.

The crest diameter CD, the root diameter RD, the pitch P, and the rotational speed of the spiral column 85 is appropriately determined according to the size of a drug 25 to be laid sideways. It is possible to apply a force, which allows the drug 25 to easily lose balance, to the drug 25, which stands up, by adjusting a difference between the crest diameter CD and the root diameter RD.

The pitch P defines the width of the spiral groove 85C. The size of the pitch P is determined as a size that allows a drug 25, which stands up, to be put in the spiral groove 85C. Since the packaging bag 27 is pressed by the first and second pressing members 82 and 83 (not shown) on the upstream side and the downstream side of the spiral column 85 in the embodiment, tension is applied to the packaging bag 27. A force, which is larger than the force to be applied to a drug 25 not standing up, is applied to a drug 25, which stands up, from the packaging bag 27 toward the spiral column 85. As a result, the drug 25, which stands up, is to be easily put in the spiral groove 85C. The drug 25, which is put in the spiral groove 85C, comes into contact with the spiral blade 85B that rotates. As a result, the drug 25, which stands up, is self-selected and is easily laid sideways by the spiral column 85.

It is preferable that the rotational speed of the spiral column 85 is set to a rotational speed for allowing the spiral blade 85B to come into contact with the drug 25 within a time required for the drug 25 to go over the spiral column 85. The reason for this is to allow the drug 25 to be more reliably laid sideways.

Accordingly, the time required for the drug 25 to go over the spiral column 85 is increased in a case where the movement speed of the dispersion mechanism 80 is reduced, and the spiral blade 85B and the drug 25 more reliably come into contact with each other in a case where the rotational speed of the spiral column 85 is increased.

The forward movement speed and the backward movement speed of the second dispersion mechanism 80 are also determined according to an object as in the case of the first dispersion mechanism 70.

Figure 9:
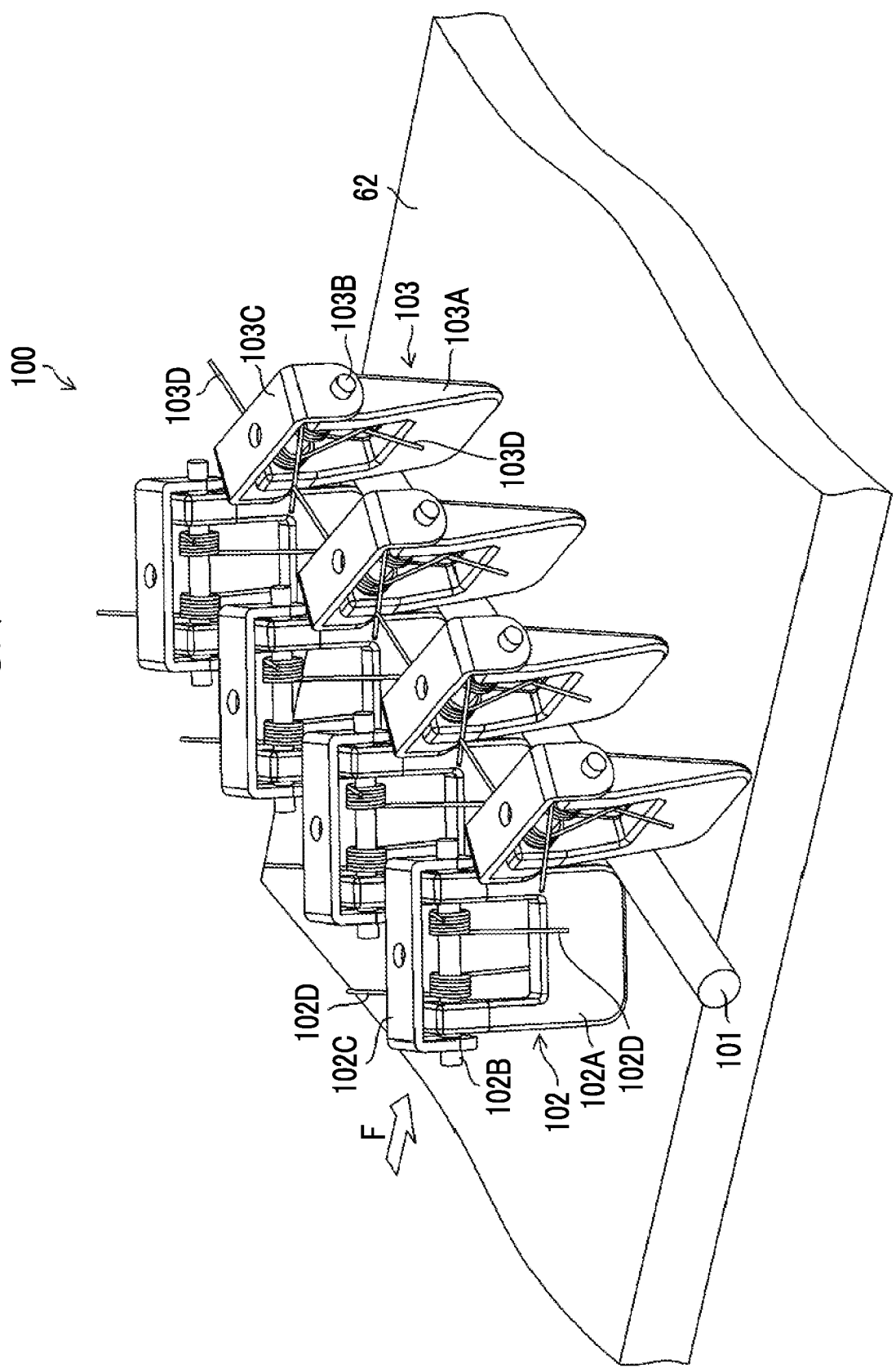
FIG. 9 is a diagram showing the structure of a third dispersion mechanism.

FIG. 9 is a diagram showing the structure of a third dispersion mechanism 100 included in the dispensing inspection device 20. The dispersion mechanism 100 comprises a column 101 that is disposed in a direction crossing the packaging bag 27 (not shown), a plurality of first pressing members 102 that are disposed upstream of the column 101 in a transport direction and are pressed against the first surface 27A of the packaging bag 27 (not shown), and a plurality of second pressing members 103 that are disposed downstream of the column 101 in the transport direction and are pressed against the first surface 27A of the packaging bag 27 (not shown).

The plurality of first pressing members 102 and the plurality of second pressing members 103 are disposed in this embodiment, but one or more first pressing members 102 and one or more second pressing members 103 have only to be disposed.

In this embodiment, the first and second pressing members 102 and 103 have the same structure. The structure of the first and second pressing members 102 and 103 will be described on the basis of the second pressing member 103. Each second pressing member 103 comprises a second plate-like member 103A that is pressed against the first surface 27A (not shown) of the packaging bag 27, a second shaft part 103B that supports the second plate-like member 103A to allow the second plate-like member 103A to be movable, a second frame 103C that supports the second shaft part 103B to allow the second shaft part 103B to be rotationally movable, and a second torsion coil spring 103D that biases the second plate-like member 103A to the first surface 27A. Since the second plate-like members 103A are biased by the second torsion coil springs 103D, the second plate-like members 103A can be moved independently.

It is preferable that the second plate-like members 103A are made of a material not damage the packaging bag 27 (not shown). For example, it is preferable that the second plate-like members 103A are made of polyoxymethylene (POM).

As described above, each first pressing member 102 comprises a first plate-like member 102A, a first shaft part 102B that supports the first plate-like member 102A to allow the first plate-like member 102A to be movable, a first frame 102C that supports the first shaft part 102B to allow the first shaft part 102B to be rotationally movable, and a first torsion coil spring 102D that biases the first plate-like member 102A to the first surface 27A.

The forward movement speed and the backward movement speed of the third dispersion mechanism 100 are also determined according to an object as in the case of the first dispersion mechanism 70. Further, the spiral column 85 applied to the second dispersion mechanism 80 is also applied to the first dispersion mechanism 70 and the third dispersion mechanism 100 according to an object of the first dispersion mechanism 70 and the third dispersion mechanism 100.

[Configuration of Dispensing Inspection Device]

Figure 10:
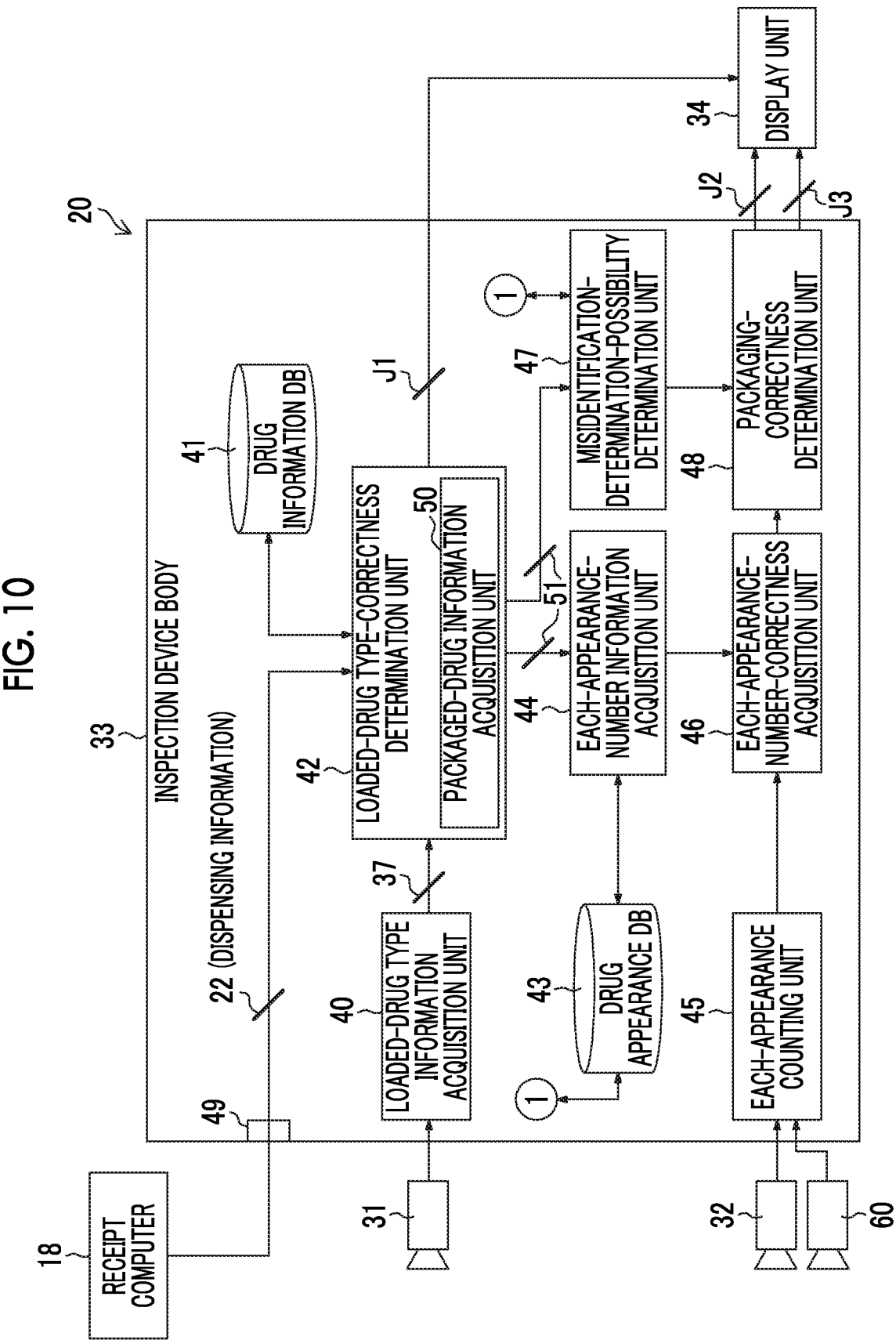
FIG. 10 is a block diagram showing the electrical configuration of an inspection device body of a dispensing inspection device.

FIG. 10 is a block diagram showing the electrical configuration of the inspection device body 33 of the dispensing inspection device 20. The inspection device body 33 comprises a loaded-drug type information acquisition unit 40, a drug information database (hereinafter, abbreviated as a drug information DB) 41, a loaded-drug type-correctness determination unit 42, a drug appearance database (hereinafter, abbreviated as a drug appearance DB) 43, an each-appearance-number information acquisition unit 44, an each-appearance counting unit 45, an each-appearance-number-correctness acquisition unit 46, a misidentification-determination-possibility determination unit 47, a packaging-correctness determination unit 48, and a communication interface (dispensing information acquisition unit) 49.

The loaded-drug type information acquisition unit 40 forms a loaded-drug type information acquisition unit together with a third camera 31. The loaded-drug type information acquisition unit 40 extracts at least one of a bar code or characters recorded on, for example, a package 36 as the drug type information 37 from the image data (including read information of a bar code) of the drug type information 37 input from the third camera 31. Further, the loaded-drug type information acquisition unit 40 outputs the drug type information 37 to the loaded-drug type-correctness determination unit 42. The loaded-drug type information acquisition unit 40 may be provided in the third camera 31 instead of being provided in the inspection device body 33.

Figure 11:
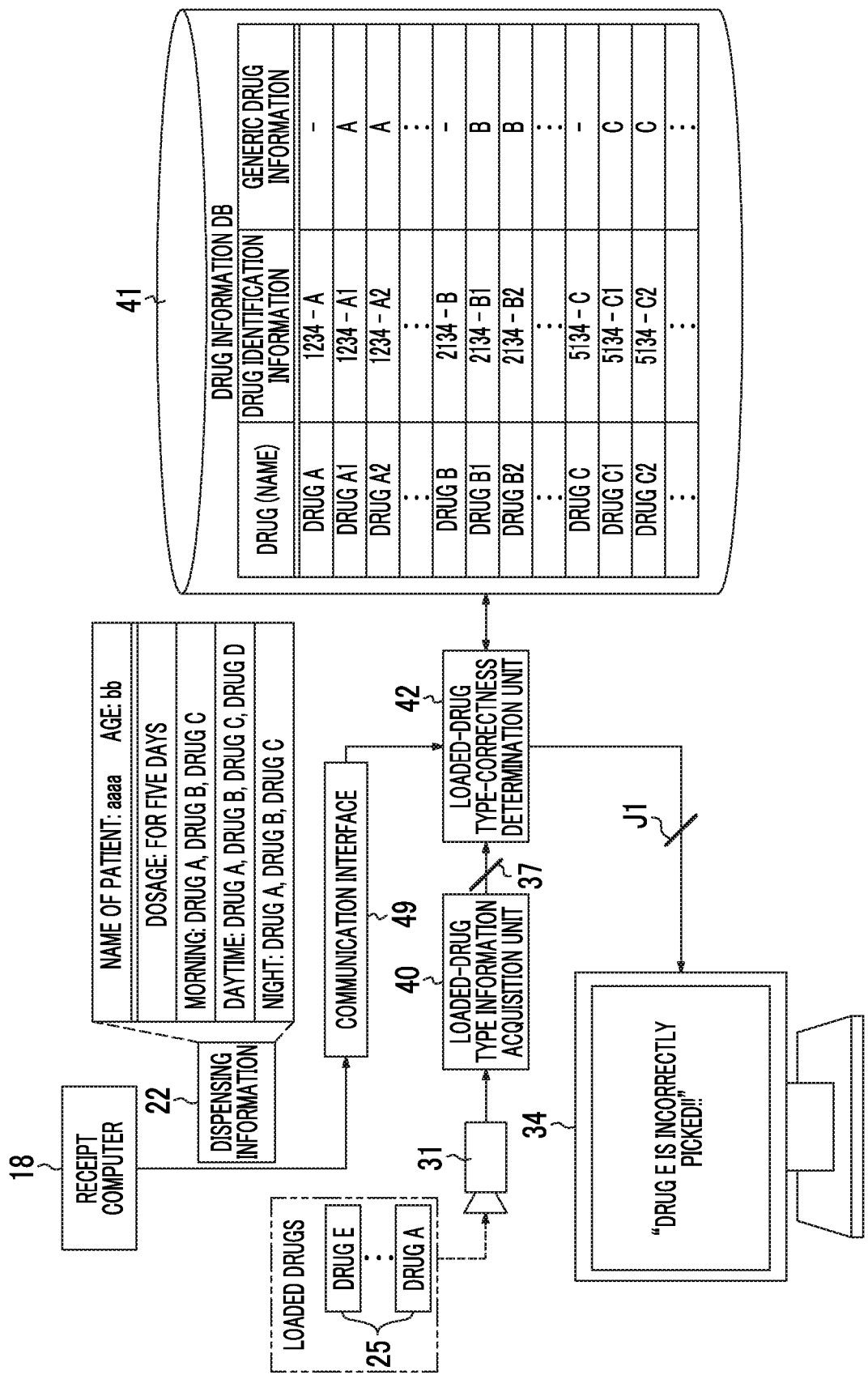
FIG. 11 is a diagram illustrating correctness determination processing that is performed by a loaded-drug type-correctness determination unit.

FIG. 11 is a diagram illustrating correctness determination processing that is performed by the loaded-drug type-correctness determination unit. As shown in FIG. 11, the types of the drugs 25, the drug type information 37, and generic drug information, which represents a correspondence relationship between original drugs and generic drugs, are stored in the drug information DB 41 in association with each other in advance. "A, A1, A2, . . . , B, B1, B2, . . . , C, C1, C2, . . . " written in a drug type column of FIG. 11, represent the types of the drugs 25. Further, drugs A1 and A2 are generic drugs of a drug A, drugs B1 and B2 are generic drugs of a drug B, and drugs C1 and C2 are generic drugs of a drug C. Hereinafter, drugs 25 to be described include all types of drugs, and the drugs A, B, . . . to be described represent the types thereof.

The drug type information 37 about the package 36 is recorded in a "drug identification information" column of FIG. 11. In a case where the drugs 25 are generic drugs, the types of the original drugs of the drugs 25 (or the drug type information 37) are recorded in a "generic drug information" column. By reference to the drug information DB 41, the types of the drugs 25 become apparent from the drug type information 37 and the original drugs or the generic drugs (drugs including the same effective components) of the drugs 25 can be determined.

The loaded-drug type-correctness determination unit 42 determines whether or not the types of the drugs 25 to be loaded in the packaging machine 26 are correct by reference to the drug information DB 41 on the basis of the dispensing information 22 that is input from the receipt computer 18 through the communication interface 49 and the drug type information 37 that is input from the loaded-drug type information acquisition unit 40.

Specifically, the loaded-drug type-correctness determination unit 42 determines the types of the drugs 25, which are to be loaded in the packaging machine 26, on the basis of the dispensing information 22. Further, the loaded-drug type-correctness determination unit 42 determines the types of the drugs 25 (shown as loaded drugs in the drawings), which are to be picked in the picking work 12 and are to be loaded in the packaging machine 26, by reference to the drug information DB 41 on the basis of the drug type information 37. Furthermore, the loaded-drug type-correctness determination unit 42 determines whether or not the types of the drugs 25 to be loaded in the packaging machine 26 are correct by comparing the types of the drugs 25, which are designated by the dispensing information 22, with the types of the drugs 25 that are to be loaded in the packaging machine 26. The loaded-drug type-correctness determination unit 42 determines that drugs corresponding to the types of the drugs 25 designated by the dispensing information 22 are correct and drugs not corresponding to the types of the drugs 25 designated by the dispensing information 22 are incorrect among the types of the respective drugs 25 to be loaded in the packaging machine 26.

At this time, in a case where the drugs 25 corresponding to the drug type information 37 are generic drugs (or original drugs) including the same effective components as the drugs 25 designated by the dispensing information 22, the loaded-drug type-correctness determination unit 42 determines that the types of drugs are correct even though the types of the drugs 25 corresponding to the drug type information 37 are not the same as the types of the generic drugs. In a case where the drugs 25 corresponding to the drug type information 37 are not generic drugs or the like of the drugs 25 designated by the dispensing information 22 but are drugs including the same effective components as the generic drugs or the like and having the same types and effects as the generic drugs or the like, the loaded-drug type-correctness determination unit 42 determines that the types of drugs are correct. In this case, information representing a correspondence relationship between drugs having the same types and effects is stored in the drug information DB 41 in advance.

In a case where the loaded-drug type-correctness determination unit 42 determines that the types of the drugs 25 to be loaded in the packaging machine 26 are incorrect, the loaded-drug type-correctness determination unit 42 outputs a determination result J including information about the types of the drugs to the display unit 34. Accordingly, the display unit 34 displays that the types of the drugs 25 to be loaded in the packaging machine 26 are incorrect, and types of the drugs 25. For example, in a case where drug type information 37 about a package 36 of a drug 25 (here, a drug E) not designated by the dispensing information 22 is imaged by the third camera 31, a determination result J1 showing that the "drug E" is incorrect is output to the display unit 34 from the loaded-drug type-correctness determination unit 42. Then, the display unit 34 displays warning information of, for example. "the drug E is incorrectly picked". The aspect of this warning display may be appropriately changed.

Returning to FIG. 10, the loaded-drug type-correctness determination unit 42 is provided with a packaged-drug information acquisition unit 50. The packaged-drug information acquisition unit 50 acquires packaged-drug information 51, which represents the types of the drugs 25 to be packaged in the respective packaging bags 27 (Package 1, Package 2, . . . ) by the packaging machine 26 and the number of the drugs for each drug type, by reference to the drug information DB 41 on the basis of the dispensing information 22 and the drug type information 37 about the respective picked drugs 25 (see FIG. 12). The packaged-drug information acquisition unit 50 outputs the packaged-drug information 51 to each of the each-appearance-number information acquisition unit 44 and the misidentification-possibility determination unit 47.

Figure 12:
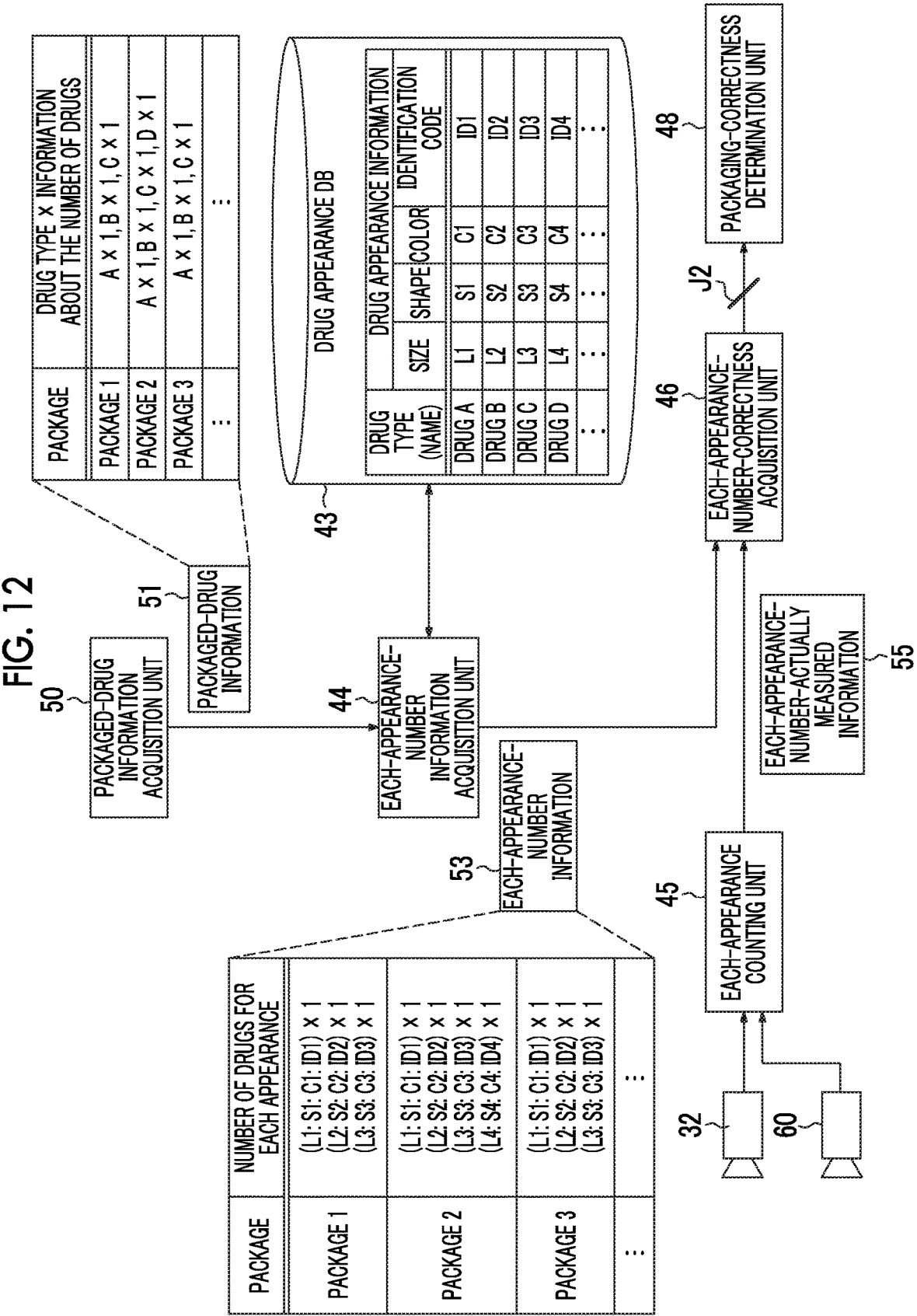
FIG. 12 is a diagram illustrating correctness determination processing that is performed by an appearance-number-correctness determination unit.

As shown in FIG. 12, the types of the respective drugs 25 and drug appearance information, which represents the appearances of the drugs, are stored in the drug appearance DB 43 in association with each other. The drug appearance information includes information that represents the sizes (the areas, the diameters, the lengths of major axes and/or minor axes, and the like), the shapes (a circular shape, a triangular shape, an elliptical shape, a capsule shape, and the like), the colors (for example, an RGB value), and identification codes (numerals, alphabets, katakana, and the like) of the drugs 25. L1, L2, L3, L4, . . . that represent the sizes of the respective drugs A, B, C, D, . . . , S1, S2, S3. S4, . . . that represent the shapes of the respective drugs A, B, C, D, . . . . C1, C2, C3, C4, . . . that represent the colors of the respective drugs A, B, C, D, . . . , and ID1, ID2, ID3, ID4, . . . are known values.

The each-appearance-number information acquisition unit 44 acquires each-appearance-number information 53, which represents the number of the drugs 25 to be packaged in the each packaging bag 27 for each of the appearances of the drugs (each-appearance-number), by reference to the drug appearance DB 43 on the basis of the packaged-drug information 51 that is input from the packaged-drug information acquisition unit 50. For example, in a case where packaged-drug information 51 corresponding to a packaging bag 27 of "Package 1" is "A×1, B×1, C×1", the each-appearance-number information acquisition unit 44 determines each-appearance-number information 53 about "Package 1" by reference to drug appearance information that is stored in the drug appearance DB 43 and corresponds to drugs A, B, and C. In this case, the each-appearance-number information 53 about "Package 1" is "(L1:S1:C1:ID1)×1, (L2:S2:C2:ID2)×1, (L3:S3:C3:ID3)×1)". Accordingly, it is understood that one drug 25 satisfying "(L1:S1:C1:ID1)", one drug 25 satisfying "(L2:S2:C2:ID2)", and one drug 25 satisfying "(L3:S3:C3:ID3)" are put in the packaging bag 27 of Package 1.

Then, the each-appearance-number information acquisition unit 44 determines each-appearance-number information 53 corresponding to packaging bags 27 of "Package 2, Package 3, . . . " in the same way. After that, the each-appearance-number information acquisition unit 44 outputs the each-appearance-number information 53 about the respective packaging bags 27 to the each-appearance-number-correctness acquisition unit 46. The each-appearance-number information acquisition unit 44 acquires the each-appearance-number information 53 on the basis of the packaged-drug information 51 acquired from the packaged-drug information acquisition unit 50 in this embodiment, but the each-appearance-number information acquisition unit 44 may have the function of the packaged-drug information acquisition unit 50. That is, the packaged-drug information acquisition unit 50 may not be provided and the each-appearance-number information acquisition unit 44 may acquire the packaged-drug information 51 by reference to the drug information DB 41 on the basis of the dispensing information 22 and the drug type information 37 acquired from the loaded-drug type-correctness determination unit 42 and the like. Accordingly, the each-appearance-number information acquisition unit 44 can acquire the each-appearance-number information 53 on the basis of at least the dispensing information 22 and the drug type information 37.

The each-appearance counting unit 45 can count the number of drugs 25, which are to be packaged in each packaging bag 27, for each of the appearances of the drugs by analyzing the image data, which is input from the fourth camera 32, of the drugs 25 that are not yet packaged and correspond to each of the packages (Package 1, Package 2, . . . ). In this embodiment, the each-appearance counting unit 45 can count the number of drugs 25, which are to be packaged in each packaging bag 27, for each of the appearances of the drugs by analyzing the image data, which is input from the imaging unit 60 (the first camera 60A and the second camera 60B), of the packaged drugs 25 that correspond to each of the packages (Package 1, Package 2, . . . ). In this embodiment, before the image data of the packaged drugs 25 corresponding to each of the packages (Package 1, Package 2 . . . ) is acquired by the first camera 60A and the second camera 60B, the dispersion mechanism 70 can be driven to disperse the drugs 25 of the packaging bag 27 corresponding to each package. Since the drugs 25 are dispersed by the dispersion mechanism 70, the drugs 25 of the packaging bag 27 can be accurately imaged.

The image data of the packaged drugs 25 corresponding to each package can also be acquired by the first camera 60A and the second camera 60B before the drive of the dispersion mechanism 70 to determine whether or not to drive the dispersion mechanism 70.

The fourth camera 32 and the imaging unit 60 are shown in FIG. 12, but image data output from at least the imaging unit 60 can be input to perform the inspection of the packaged drugs 25.

Specifically, the each-appearance counting unit 45 can determine the sizes and shapes of the drugs 25 of an image by performing publicly known edge extraction processing or segmentation processing on the image data to extract the contours of the drugs 25 of the image. Further, in a case where the image data is color image data, the each-appearance counting unit 45 can determine the colors of the drugs 25 of the image on the basis of the image data. In a case where the image data is identification codes, the each-appearance counting unit 45 can determine the identification codes of the drugs 25 of the image on the basis of the image data. A method of counting the number of the drugs 25 for each of the appearances of the drugs based on the image data is not particularly limited, and various methods publicly known may be used. The each-appearance counting unit 45 outputs each-appearance-number-actually measured information 55, which represents the results of the counting of the number of drugs for each of the appearances of the drugs, (hereinafter, simply abbreviated as actually measured information) to the each-appearance-number-correctness acquisition unit 46.

An identification code means a character, a pictograph, or the like that is engraved or printed on a pill, a capsule, or the like for the purpose of identification.

The actually measured information 55 is information of which the format is basically the same as the format of the above-mentioned each-appearance-number information 53, and the results of the counting of the number of drugs for each package "Appearance 1 (size, shape, color, identification code)×the number of drugs, Appearance 2 (size, shape, color, identification code)×the number of drugs, . . . " are recorded in the actually measured information 55.

The each-appearance-number-correctness acquisition unit 46 compares the each-appearance-number information 53, which is input from the each-appearance-number information acquisition unit 44, with the actually measured information 55 that is input from the each-appearance counting unit 45. Then, the each-appearance-number-correctness acquisition unit 46 determines whether or not the number of drugs 25 to be packaged in each packaging bag 27 for each of the appearances of the drugs is correct on the basis of whether or not the actually measured information 55 corresponds to the each-appearance-number information 53, and outputs a determination result J2 to the packaging-correctness determination unit 48. At this time, in a case where the number of drugs 25 to be packaged in the packaging bag 27 for each of the appearances of the drugs is incorrect, the each-appearance-number-correctness acquisition unit 46 outputs the determination result J2, which includes information representing the corresponding packaging bag 27, to the packaging-correctness determination unit 48.

Figure 13:
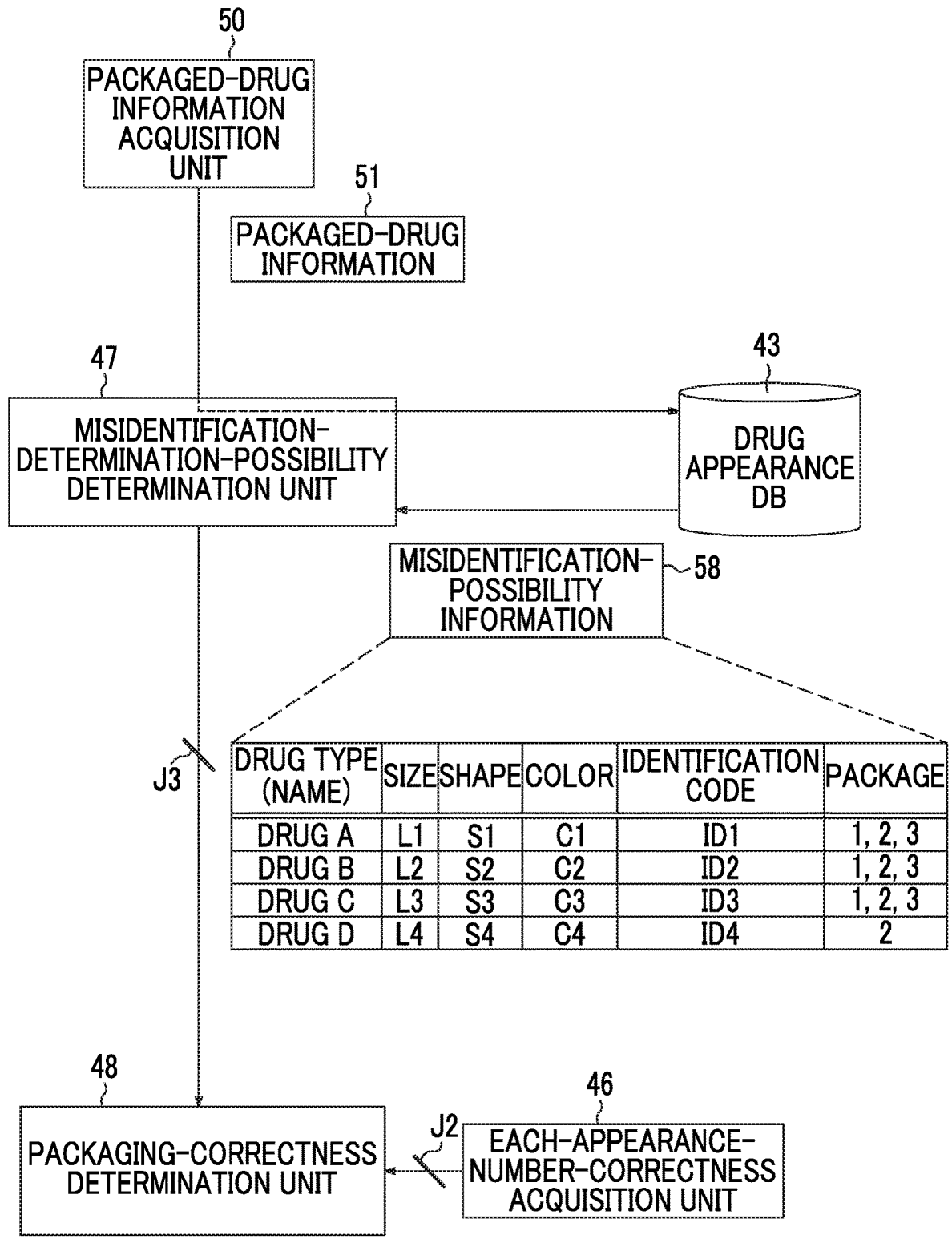
FIG. 13 is a diagram illustrating determination processing that is performed by a misidentification-determination-possibility determination unit.

As shown in FIG. 13, the misidentification-determination-possibility determination unit 47 determines whether or not the presence/absence of misidentification of the drugs 25 can be determined by reference to the drug appearance DB 43 on the basis of the packaged-drug information 51 that is input from the packaged-drug information acquisition unit 50.

As shown in FIG. 13, the misidentification-determination-possibility determination unit 47 acquires misidentification-possibility information 58, which represents whether or not the presence/absence of misidentification of the drugs 25 can be determined, by reference to the drug appearance DB 43 on the basis of the packaged-drug information 51 that is input from the packaged-drug information acquisition unit 50. Specifically, the misidentification-determination-possibility determination unit 47 acquires drug appearance information, which is included in the packaged-drug information 51 and corresponds to each drug 25, by reference to the drug appearance DB 43 on the basis of the packaged-drug information 51. Information, which represents packaging bags 27 (Package 1, Package 2, . . . ) in which drugs 25 are to be put, is stored in a "package" column of the misidentification-possibility information 58.

After that, the misidentification-determination-possibility determination unit 47 determines whether or not the presence/absence of misidentification of the drugs 25 to be packaged in each packaging bag 27 can be determined on the basis of the misidentification-possibility information 58. Specifically, the misidentification-determination-possibility determination unit 47 determines whether or not the appearances of different kinds of drugs 25 to be put in different packaging bags 27 (drugs 25 of which the kinds are different between the packaging bags) satisfy the following first to fourth conditions. The number of these conditions is increased or decreased according to the number of each-appearance-number parameters (size, shape, color, identification code).

The first condition is a condition where a difference in shape between the above-mentioned different kinds of drugs 25 is small. For example, in a case where a difference between the drugs, which is obtained in a case where the shape of each of the different kinds of drugs 25 is represented by a difference in diameter between a circumscribed circle and an inscribed circle, is less than 0.1 mm or in a case where a difference between the drugs, which is obtained in a case where the shape of each of the different kinds of drugs 25 is represented by the maximum distance between a circumscribed circle and the outer edge of each drug, is less than 0.1 mm, the misidentification-determination-possibility determination unit 47 determines that a difference in shape between the different kinds of drugs 25 is small.

The second condition is a condition where a difference in size between the above-mentioned different kinds of drugs 25 is small. For example, in a case where a difference in diameter between the different kinds of drugs 25 is less than 0.1 mm or in a case where a difference between the drugs in terms of the shortest distance between the center of the drug 25 (a point where the sum of distances from the entire circumference of the outer edge of the drug is smallest) and the outer edge of the drug 25 is less than 0.05 mm, the misidentification-determination-possibility determination unit 47 determines that a difference in size between the drugs 25 is small.

The third condition is a condition where a difference in color and brightness between the above-mentioned different kinds of drugs 25 is small. For example, in a case where a difference in color (ΔE) between the drugs under a standard light source is smaller than 2.0 or a case where a difference in RGB value between the drugs is less than 10% over all colors, the misidentification-determination-possibility determination unit 47 determines that a difference in color and brightness between the above-mentioned different kinds of drugs 25 is small. A publicly known technique, which is prescribed by International Commission on Illumination (CIE) or the like, may be used as a method of calculating a difference in color.

The fourth condition is a condition where the degree of similarity between identification codes of the above-mentioned different kinds of drugs 25 is high. The degree of similarity means a numerical value that represents the degree of similarity between images, and can be obtained by various methods that are not particularly limited. For example, the misidentification-determination-possibility determination unit 47 obtains the degree of similarity by a correlation operation between images, and determines that the degree of similarity is high in a case where the obtained degree of similarity exceeds a predetermined degree of similarity.

In a case where the appearances of the different kinds of drugs 25 to be put in different packaging bags 27 satisfy the first to fourth conditions, the misidentification-determination-possibility determination unit 47 determines that the presence/absence of misidentification of the drugs 25 cannot be determined, on the basis of the misidentification-possibility information 58. Then, in a case where the presence/absence of misidentification of the different kinds of drugs 25 cannot be determined, the misidentification-determination-possibility determination unit 47 generates a determination result J3 (see FIG. 15) that includes the types of the different kinds of drugs 25.

On the other hand, in a case where the appearances of the different kinds of drugs 25 to be put in different packaging bags 27 do not satisfy any of the first to fourth conditions, the misidentification-determination-possibility determination unit 47 determines that the presence/absence of misidentification can be determined and generates a determination result J3.

Further, the misidentification-determination-possibility determination unit 47 also determines whether or not the different kinds of drugs 25 to be put in the same packaging bag 27 satisfy the first to fourth conditions, and generates a determination result J3. In a case where the misidentification-determination-possibility determination unit 47 determines that the presence/absence of misidentification of the different kinds of drugs 25 cannot be determined, the types of the different kinds of drugs 25 are included in the determination result J3.

The misidentification-determination-possibility determination unit 47 outputs the determination result J3 to the packaging-correctness determination unit 48. In this embodiment, the misidentification-determination-possibility determination unit 47 acquires the misidentification-possibility information 58 on the basis of the packaged-drug information 51 acquired from the packaged-drug information acquisition unit 50 and determines whether or not the presence/absence of misidentification of the drugs 25 can be determined. However, the misidentification-determination-possibility determination unit 47 may have the function of the packaged-drug information acquisition unit 50. That is, the packaged-drug information acquisition unit 50 may not be provided and the misidentification-determination-possibility determination unit 47 may acquire the misidentification-possibility information 58 by reference to the drug appearance DB 43 on the basis of the dispensing information 22 and the drug type information 37 acquired from the loaded-drug type-correctness determination unit 42 and the like. Accordingly, the misidentification-determination-possibility determination unit 47 can determine whether or not the presence/absence of misidentification of the drugs 25 can be determined on the basis of at least the dispensing information 22 and the drug type information 37.

The packaging-correctness determination unit 48 determines whether or not the drugs 25 packaged in each packaging bag 27 are correct on the basis of the determination result J2 of the each-appearance-number-correctness acquisition unit 46 and the determination result J3 of the misidentification-determination-possibility determination unit 47. Specifically, in a case where the number of drugs 25 to be put in each packaging bag 27 for each of the appearances of the drugs is correct and the presence/absence of misidentification of the drugs 25 can be determined, the packaging-correctness determination unit 48 determines that the drugs 25 packaged in each packaging bag 27 are correct.

Figure 14:
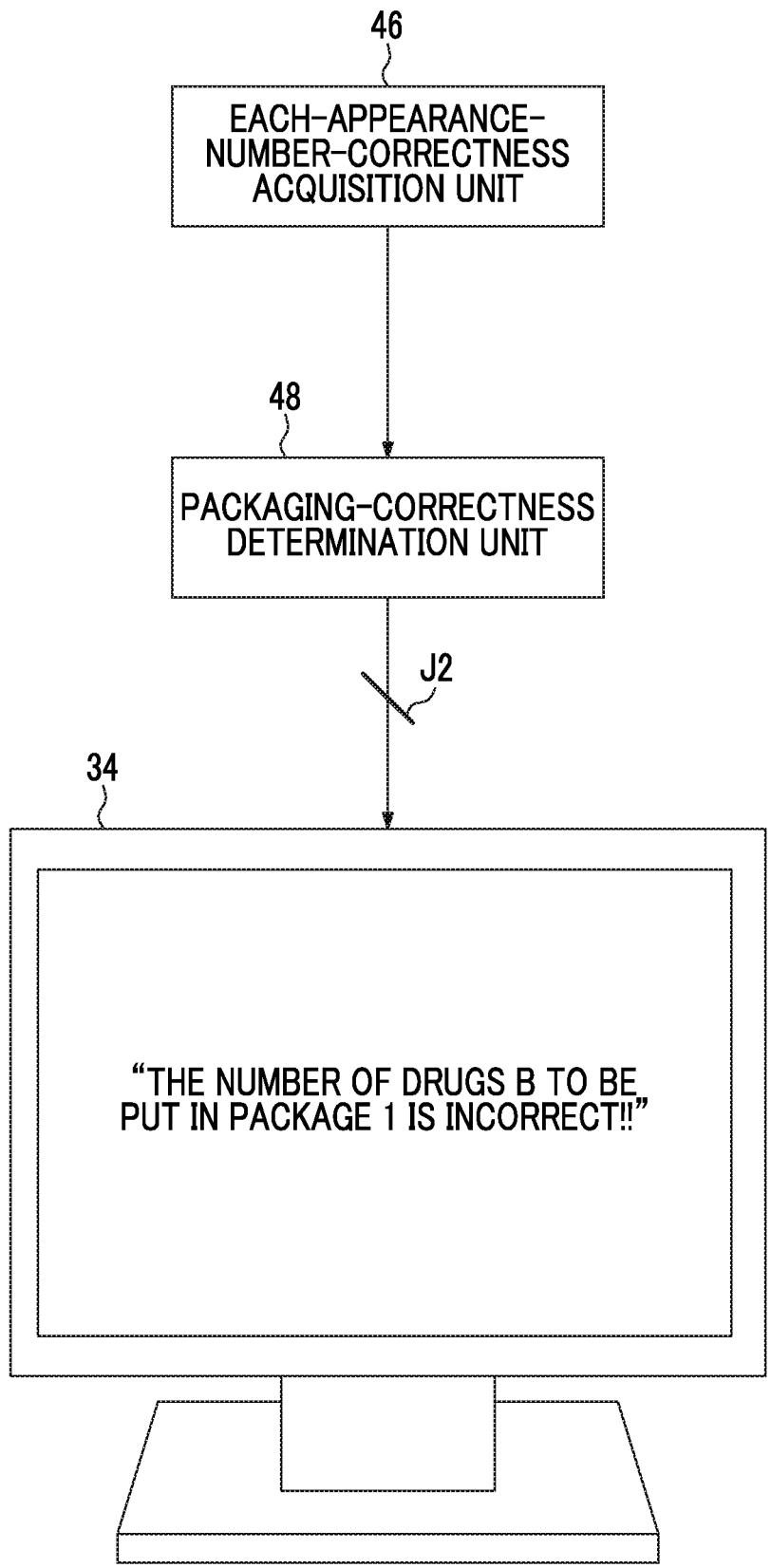
FIG. 14 is a diagram illustrating an example of a warning display in a case where the appearance-number-correctness determination unit makes an erroneous determination.

On the other hand, in a case where the number of drugs 25 to be packaged in the packaging bag 27 for each of the appearances of the drugs is incorrect, the packaging-correctness determination unit 48 determines that the drugs 25 packaged in the corresponding packaging bag 27 are incorrect. Then, as shown in FIG. 14, the packaging-correctness determination unit 48 outputs the determination result J2, which represents the packaging bag 27 of which the number of drugs 25 for each of the appearances of the drugs is incorrect, to the display unit 34. Accordingly, warning information, which represents the packaging bag 27 of which the number of drugs for each of the appearances of the drugs is incorrect, is displayed on the display unit 34.

Figure 15:
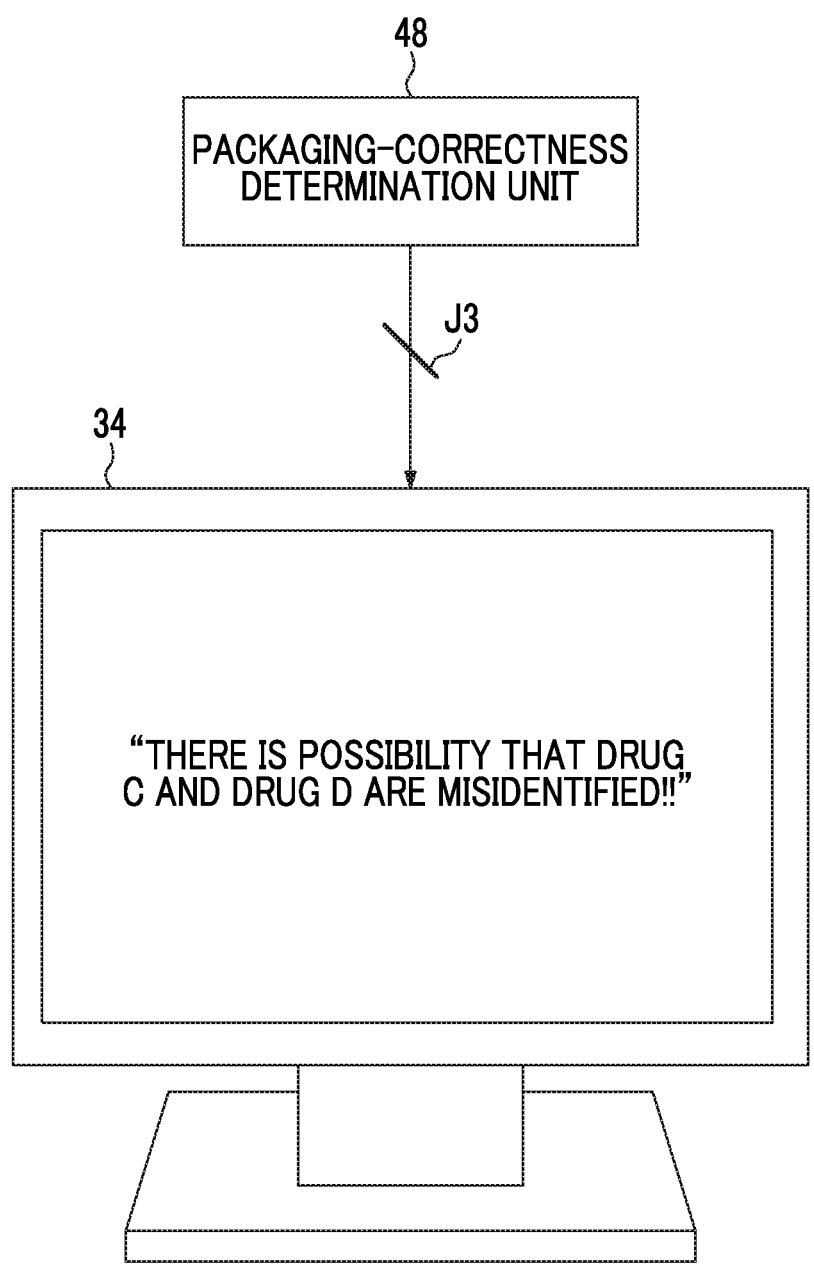
FIG. 15 is a diagram illustrating an example of a warning display in a case where the misidentification-determination-possibility determination unit determines that the presence/absence of misidentification cannot be determined.

Further, in a case where the presence/absence of misidentification of the different kinds of drugs 25 cannot be determined, the packaging-correctness determination unit 48 determines that there is a possibility that the drugs 25 packaged in each packaging bag 27 is not correct. Then, as shown in FIG. 15, the packaging-correctness determination unit 48 outputs the determination result J3, which represents the types of the drugs 25 of which the presence/absence of misidentification cannot be determined, to the display unit 34. Accordingly, warning information, which represents the types of the drugs 25 of which the presence/absence of misidentification cannot be determined, is displayed on the display unit 34.

In a case where the number of drugs 25 to be packaged in the packaging bag 27 for each of the appearances of the drugs is incorrect and the presence/absence of misidentification of the different kinds of drugs 25 cannot be determined, both the warning information shown in FIG. 14 and the warning information shown in FIG. 15 are displayed on the display unit 34.

[Description of Flow of Procedure of Dispensing Inspection]

Figure 16:
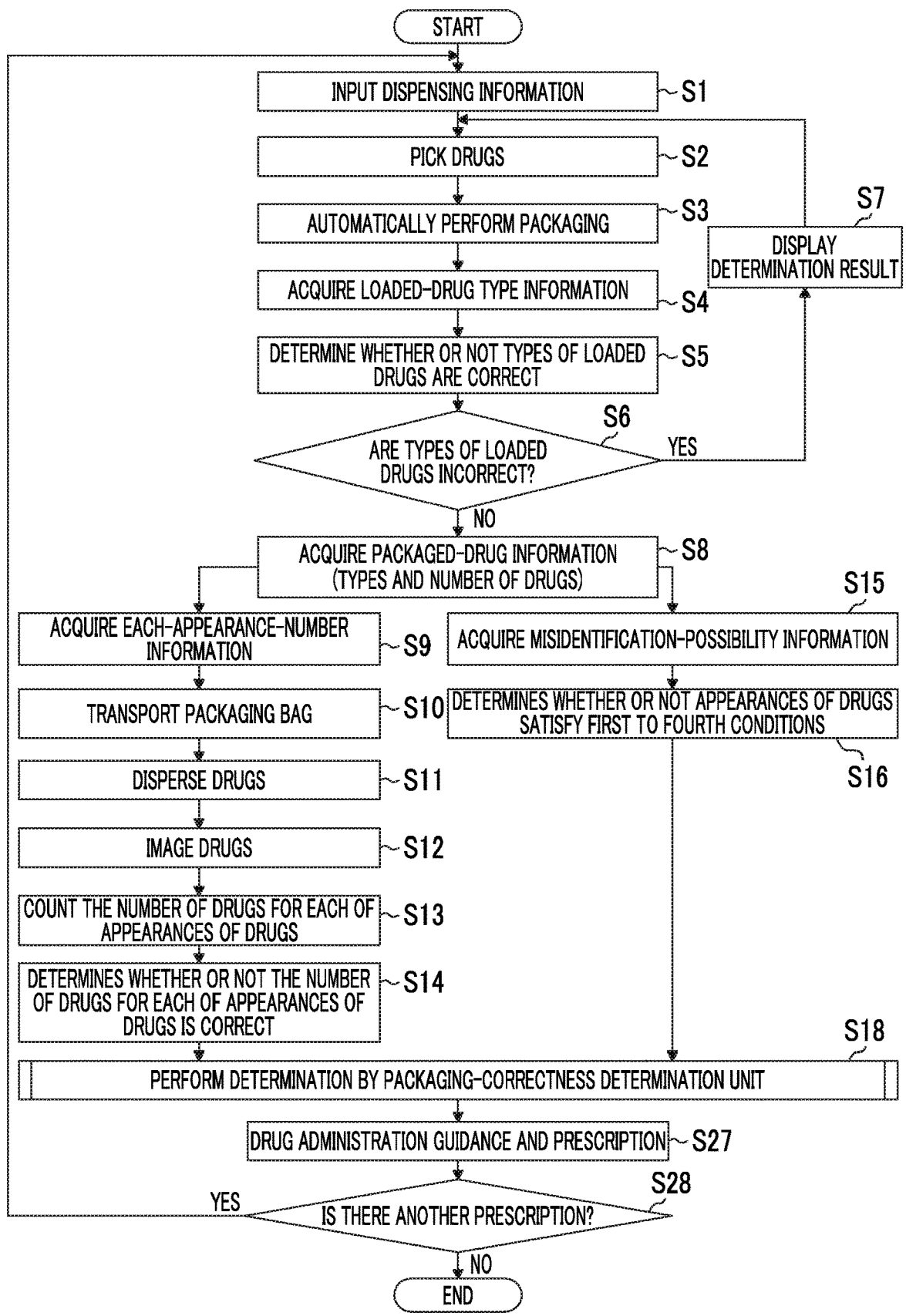
FIG. 16 is a flowchart showing the flow of dispensing inspection processing in the drug prescription work.

Next, the flow of a procedure of dispensing inspection (also referred to as one-package drug inspection) for the drugs packaged in the packaging bag will be described. FIG. 16 is a flowchart showing the procedure of dispensing inspection in which the dispensing inspection method of this embodiment is included.

In a case where a pharmacist receives a prescription, the drug prescription work 10 starts. First, in the prescription input work 11, the pharmacist inputs dispensing information 22, which is written on the prescription, to the receipt computer 18 and outputs the dispensing information 22 using the printer 19 (Step S1). Further, the receipt computer 18 outputs the dispensing information 22, which is input by the pharmacist, to the dispensing inspection device 20. Accordingly, the dispensing inspection device 20 can acquire the dispensing information 22.

The pharmacist performs the picking work 12 for picking drugs 25, which correspond to the dispensing information 22 output from the printer 19, from the drug shelf 24 (Step S2).

After the picking work 12 (Step S2) shown in FIG. 16, the flow proceeds to the automatic packaging work 13 (Step S3). In the automatic packaging work 13 (Step S3), packaging is performed by the packaging machine 26. Further, loaded-drug type information acquisition (Step S4) and loaded-drug type-correctness determination (Step S5) are performed in parallel with the automatic packaging work 13 (Step S3).

In the loaded-drug type information acquisition (Step S4) shown in FIG. 16, a package 36 of the picked drugs 25 is set in front of the third camera 31 shown in FIG. 1 after the picking work (Step S2). The package 36 is shown in FIG. 1.

Then, drug type information 37 about the drug 25 is imaged by the third camera 31. The image data of the drug type information 37 is output to the loaded-drug type information acquisition unit 40 from the third camera 31. The drug type information 37 is extracted from the image data by the loaded-drug type information acquisition unit 40 shown in FIG. 10.

In the loaded-drug type-correctness determination (Step S5) shown in FIG. 16, the drug type information 37 output from the loaded-drug type information acquisition unit 40 is acquired by the loaded-drug type-correctness determination unit 42 shown in FIG. 10. Then, in the loaded-drug type-correctness determination (Step S5) shown in FIG. 16, whether or not the types of the drugs 25 loaded in the packaging machine 26 shown in FIG. 1 are correct is determined by reference to the drug information database 41 on the basis of the drug type information 37 and the dispensing information 22.

In a case where the types of the drugs 25 to be loaded in the packaging machine 26 shown in FIG. 1 are the same as the types of the drugs 25 designated by the dispensing information 22 or correspond to original drugs, generic drugs, or the like including the same effective components as the drugs 25 designated by the dispensing information 22 in the loaded-drug type-correctness determination (Step S5) shown in FIG. 16, it is determined that the types of the drugs 25 to be loaded in the packaging machine 26 are correct (Step S6). In this case, the determination in Step S6 shown in FIG. 16 is the determination of "NO".

On the other hand, in a case where the types of the drugs 25 to be loaded in the packaging machine 26 shown in FIG. 1 are not the same as the types of the drugs 25 designated by the dispensing information 22 or do not correspond to original drugs of the drugs 25 designated by the dispensing information 22, generic drugs thereof, or the like in the loaded-drug type-correctness determination (Step S5) shown in FIG. 16, it is determined that the types of the drugs 25 to be loaded in the packaging machine 26 are incorrect. In this case, the determination in Step S6 shown in FIG. 16 is the determination of "YES".

If the determination in Step S6 is the determination of "YES", the flow proceeds to determination result display (Step S7). In the determination result display (Step S7) shown in FIG. 16, the display unit 34 shown in FIG. 1 displays that the types of the drugs 25 to be loaded in the packaging machine 26 are incorrect and displays the types of the drugs 25. Accordingly, the pharmacist can be warned that there is a mistake in the picking work 12 (Step S2) shown in FIG. 16, and can be urged to perform the picking work 12 (Step S2) again.

In a case where the types of the drugs 25 to the loaded in the packaging machine 26 shown in FIG. 1 are correct, processing from the picking work 12 (Step S2) to the determination result display (Step S7) shown in FIG. 16 is repeated until the determination of the loaded-drug type-correctness determination unit 42 shown in FIG. 10.

If the determination in Step S6 shown in FIG. 16 is the determination of "NO", the flow proceeds to packaged-drug information acquisition (Step S8). In the packaged-drug information acquisition (Step S8), the packaged-drug information acquisition unit 50 acquires the packaged-drug information 51 about the drugs 25, which correspond to one package, by reference to the drug information database 41 on the basis of the dispensing information 22 and the drug type information 37 about the drugs 25.

Then, in the packaged-drug information acquisition (Step S8), the packaged-drug information acquisition unit 50 shown in FIG. 10 outputs the packaged-drug information 51 to the each-appearance-number information acquisition unit 44 and the misidentification-determination-possibility determination unit 47.

In each-appearance-number information acquisition (Step S9), the each-appearance-number information acquisition unit 44 shown in FIG. 12 acquires the each-appearance-number information 53 by reference to the drug appearance database 43 on the basis of the packaged-drug information 51 that is input from the packaged-drug information acquisition unit 50. In the each-appearance-number information acquisition (Step S9) shown in FIG. 16, the each-appearance-number information 53 shown in FIG. 12 is output to the each-appearance-number-correctness acquisition unit 46.

After that, as shown in FIG. 16, each packaging bag 27, which stores the drugs 25, is transported to the imaging position in the transport of the packaging bag (Step S10: transport step). In the transport of the packaging bag (Step S10), each packaging bag 27 in which the drugs 25 are packaged by the packaging machine 26 is disposed on the transport passage 62 and is transported to the position of the imaging unit 60. The transport of the packaging bag 27 is stopped at the position of the imaging unit 60.

In the dispersion of the drugs (Step S11: dispersion step), the drugs 25 of the packaging bag 27 shown in FIG. 1 are dispersed by the dispersion mechanisms 70 and 80 before the drugs 25 packaged in the packaging bag 27 are imaged by the imaging unit 60. The dispersion mechanisms 70 and 80 eliminate the overlapping of the drugs 25 of the packaging bag 27 or disperse the drugs 25 so that the postures of the drugs 25, which stand up in the packaging bag 27, are changed to a stable state where the drugs 25 are laid sideways.

In a case where the drugs 25 are to be dispersed, it is preferable that the operations and structures of the dispersion mechanisms 70 and 80 are changed on the basis of the information of the prescription.

For example, distances between the first pressing members 72 and 82 and the second pressing members 73 and 83 of the dispersion mechanisms 70 and 80, the sizes of the columns 71 and 81, and the like can be adjusted according to the sizes and shapes of the drugs 25. Further, a change in an operation can be made to move the dispersion mechanisms 70 and 80 slow in a case where the drugs 25 are small and to move the dispersion mechanisms 70 and 80 fast in a case where the drugs 25 are large.

In the imaging of the drugs (Step S12: imaging step) shown in FIG. 16, the drugs 25 of the packaging bag 27, which are placed on the transport passage 62 and are dispersed, are imaged by the first and second cameras 60A and 60B shown in FIG. 1. The image data of the drugs 25 is output to the each-appearance counting unit 45.

In the counting of the number of drugs for each appearance (Step S13) shown in FIG. 16, the each-appearance counting unit 45 shown in FIG. 12 analyzes the image data of the packaged drugs 25 and counts the number of the drugs 25 packaged in the packaging bag 27 for each of the appearances of the drugs. The actually measured information 55, which represents the result of the counting, is output to the each-appearance-number-correctness acquisition unit 46.

In each-appearance-number correctness determination (Step S14) shown in FIG. 16, the each-appearance-number-correctness acquisition unit 46 shown in FIG. 12 compares the each-appearance-number information 53, which is input from the each-appearance-number information acquisition unit 44, with the actually measured information 55, which is input from the each-appearance counting unit 45, and determines whether or not the number of drugs 25 packaged in the packaging bag 27 for each of the appearances of the drugs is correct.

Then, in a case where the number of drugs 25 packaged in the packaging bag 27 for each of the appearances of the drugs is correct, the each-appearance-number-correctness acquisition unit 46 outputs the determination result J2, which shows that the number of drugs 25 packaged in the packaging bag 27 for each of the appearances of the drugs is correct, to the packaging-correctness determination unit 48. On the other hand, in a case where the number of drugs 25 packaged in the packaging bag 27 for each of the appearances of the drugs is incorrect, the each-appearance-number-correctness acquisition unit 46 outputs the determination result J2, which shows that the number of drugs 25 packaged in the packaging bag 27 for each of the appearances of the drugs is incorrect and represents the corresponding packaging bag 27, to the packaging-correctness determination unit 48.

In misidentification-possibility information acquisition (Step S15) shown in FIG. 16, the misidentification-possibility information 58 is acquired by reference to the drug appearance database 43 on the basis of the packaged-drug information 51 that is input from the packaged-drug information acquisition unit 50 shown in FIG. 13. After the misidentification-possibility information acquisition (Step S15) shown in FIG. 16, the flow proceeds to packaging-correctness determination (Step S18).

In condition determination (Step S16), the misidentification-determination-possibility determination unit 47 shown in FIG. 13 determines whether or not the appearances of different kinds of drugs 25 to be put in different packaging bags 27 or the same packaging bags 27 satisfy the above-mentioned first to fourth conditions on the basis of the misidentification-possibility information 58.

Then, in a case where the presence/absence of misidentification of the different kinds of drugs 25 can be determined, a determination result J3, which shows that the presence/absence of misidentification of the different kinds of drugs 25 can be determined, is generated in the condition determination (Step S16) shown in FIG. 16. The determination result J3 is shown in FIG. 13. In a case where the presence/absence of misidentification of the different kinds of drugs 25 cannot be determined, a determination result J3, which includes the types of the different kinds of corresponding drugs 25, is generated.

Then, in the condition determination (Step S16) shown in FIG. 16, the determination result J3 is output to the packaging-correctness determination unit 48 shown in FIG. 13. After the condition determination (Step S16) shown in FIG. 16, the flow proceeds to the packaging-correctness determination (Step S18).

In the packaging-correctness determination (Step S18: inspection step), the packaging-correctness determination unit 48 shown in FIG. 13 acquires the determination result J2 of the each-appearance-number correctness determination (Step S14) shown in FIG. 16 and the determination result J3 of the condition determination (Step S16).

Then, it is determined whether or not the drugs 25 packaged in the packaging bag 27 are correct on the basis of the determination results J2 and J3.

Figure 17:
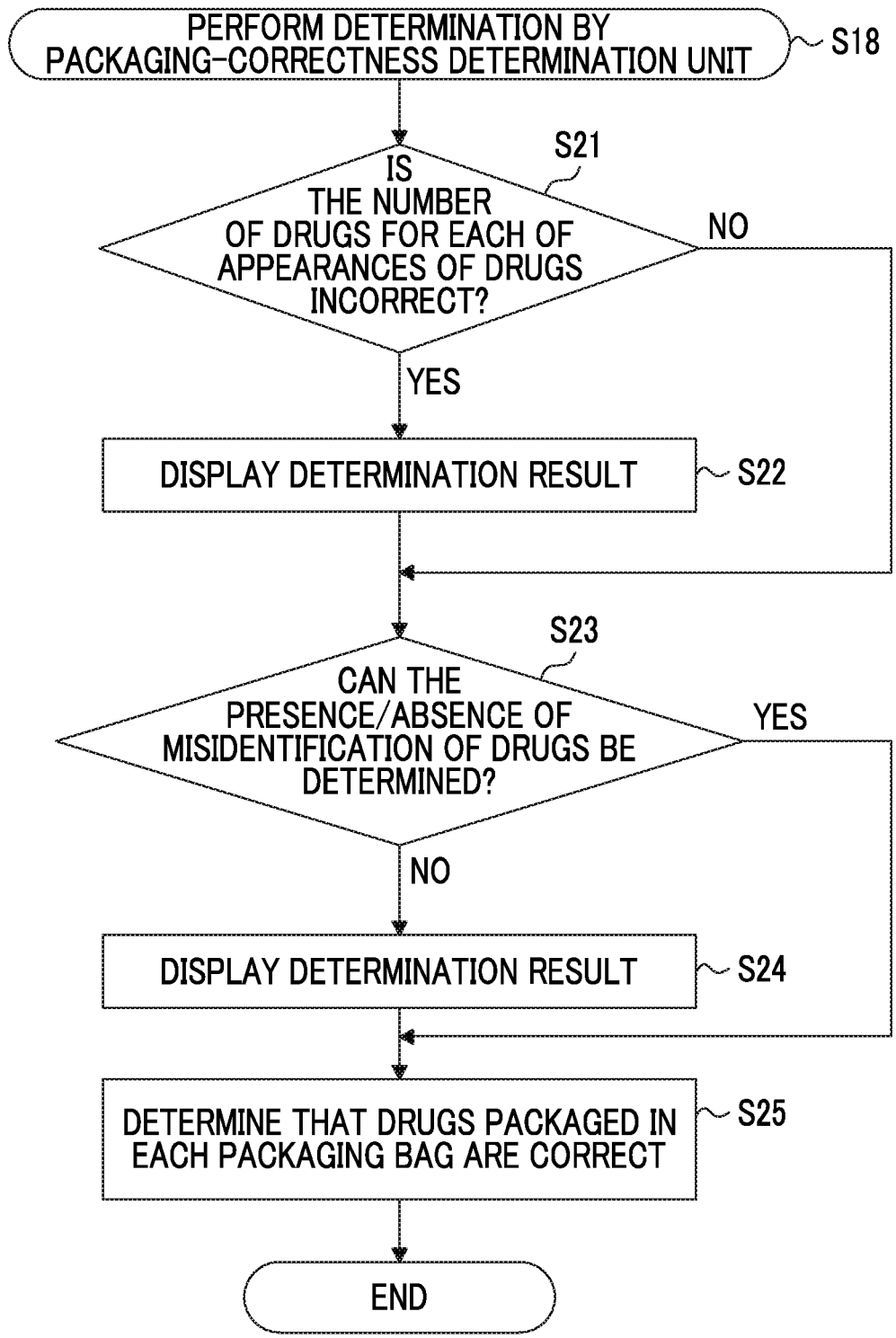
FIG. 17 is a flowchart showing the flow of determination processing that is performed by a packaging-correctness determination unit.

As shown in FIG. 17, in a case where the number of the drugs 25 to be packaged in the packaging bag 27 for each of the appearances of the drugs is incorrect, the packaging-correctness determination unit 48 determines that the drugs 25 packaged in the corresponding packaging bag 27 is incorrect and outputs the determination result J2 to the display unit 34 (YES in Step S21). Accordingly, since warning information, which represents the packaging bag 27 of which the number of drugs for each of the appearances of the drugs is incorrect, is displayed on the display unit 34 as shown in FIG. 14, it is possible to call the attention of a pharmacist who performs the dispensing inspection work 14 (Step S22). Even in a case where the number of drugs 25 to be packaged in each packaging bag 27 for each of the appearances of the drugs is correct (NO in Step S21), the display unit 34 may be allowed to display that the number of drugs 25 to be packaged in each packaging bag 27 for each of the appearances of the drugs is correct.

After that, in a case where the presence/absence of misidentification of the different kinds of drugs 25 cannot be determined, the packaging-correctness determination unit 48 determines that there is a possibility that the drugs 25 packaged in each packaging bag 27 are not correct and outputs a determination result J3 to the display unit 34 (NO in Step S23). Accordingly, since the types of the drugs 25 of which the presence/absence of misidentification cannot be determined are displayed on the display unit 34 as shown in FIG. 15, it is possible to call the attention of the pharmacist who performs the dispensing inspection work 14 (Step S24). Even in a case where the presence/absence of misidentification of the different kinds of drugs 25 cannot be determined (YES in Step S23), the display unit 34 may be allowed to display that the presence/absence of misidentification of the different kinds of drugs 25 cannot be determined.

In a case where the number of drugs 25 to be put in each packaging bag 27 for each of the appearances of the drugs is correct and the presence/absence of misidentification of the drugs 25 can be determined, the packaging-correctness determination unit 48 determines that the drugs 25 packaged in each packaging bag 27 are correct (Step S25). Even in this case, the display unit 34 may be allowed to display information showing that the drugs 25 packaged in each packaging bag 27 are correct. Inspection performed by the dispensing inspection device 20 is completed in this way.

Returning to FIG. 16, in a case where it is determined that the number of drugs 25 to be put in the packaging bag 27 for each of the appearances of the drugs is correct and it is determined that the presence/absence of misidentification of the drugs 25 can be determined in the packaging-correctness determination (Step S18), the drug administration guidance and the prescription work 15 are performed in turn (Step S27). Whenever the pharmacist receives a new prescription, the processing of the above-mentioned steps will be repeatedly performed (Step S28).

The dispensing inspection device 20, which is used in the drug prescription work 10, has been described in the above-mentioned embodiment by way of example, but the invention can be applied to dispensing inspection devices 20 that inspects drugs 25 packaged by various packaging machines.

In this embodiment, the loaded-drug type information acquisition unit 40, the loaded-drug type-correctness determination unit 42, the each-appearance-number information acquisition unit 44, the each-appearance counting unit 45, the each-appearance-number-correctness acquisition unit 46, the misidentification-determination-possibility determination unit 47, the packaging-correctness determination unit 48, and the packaged-drug information acquisition unit 50 are formed of one or a plurality of central processing units (CPUs), and are operated in a case where programs stored in a recording unit (not shown) are loaded in the CPUs.

EXPLANATION OF REFERENCES

- 10: drug prescription work
- 11: prescription input work
- 12: picking work
- 13: automatic packaging work
- 14: dispensing inspection work
- 15: prescription work
- 18: receipt computer
- 19: printer
- 20: dispensing inspection device
- 21: printed matter
- 22: dispensing information
- 24: drug shelf
- 25: drug
- 26: packaging machine
- 27: packaging bag
- 27A: first surface
- 27B: second surface
- 31: third camera
- 32: fourth camera
- 33: inspection device body
- 34: display unit
- 36: package
- 37: drug type information
- 40: loaded-drug type information acquisition unit
- 41: drug information database
- 42: loaded-drug type-correctness determination unit
- 43: drug appearance database
- 44: each-appearance-number information acquisition unit
- 45: each-appearance counting unit
- 46: each-appearance-number-correctness acquisition unit
- 47: misidentification-determination-possibility determination unit
- 48: packaging-correctness determination unit
- 49: communication interface
- 50: packaged-drug information acquisition unit
- 51: packaged-drug information
- 53: each-appearance-number information
- 55: each-appearance-number-actually measured information
- 58: misidentification-possibility information
- 60: imaging unit
- 60A: first camera
- 60B: second camera
- 62: transport passage
- 70: dispersion mechanism
- 71: column
- 72: first pressing member
- 72A: first wheel
- 72B: first axle
- 72C: first frame
- 72D: first shaft
- 72E: first fixing part
- 72F: first spring
- 73: second pressing member
- 73A: second wheel
- 73B: second axle
- 73C: second frame
- 73D: second shaft
- 73E: second fixing part
- 73F: second spring
- 80: dispersion mechanism
- 81: column
- 82: first pressing member
- 82A: first distal end member
- 82B: first shaft
- 82C: first coil spring
- 82D: first ring
- 82E: first bracket
- 82F: first sleeve
- 83: second pressing member
- 83A: second distal end member
- 83B: second shaft
- 83C: second coil spring
- 83D: second ring
- 83E: second bracket
- 83F: second sleeve
- 85: spiral column
- 85A: column 85B: spiral blade
85C: spiral groove
90: swell
100: dispersion mechanism
101: column
102: first pressing member
102A: first plate-like member
102B: first shaft part
102C: first frame
102D: first torsion coil spring
103: second pressing member
103A: second plate-like member
103B: second shaft part
103C: second frame
103D: second torsion coil spring
F: transport direction

What is claimed is:

1. A dispensing inspection device comprising:
a transport passage that transports a packaging bag in which drugs are packaged;
an imaging unit that images the drugs packaged in the packaging bag on the transport passage;
a dispersion mechanism that disperses the drugs packaged in the packaging bag on the transport passage; and
an inspection unit that inspects the drugs on the basis of an image of the drugs taken by the imaging unit,
wherein the dispersion mechanism includes a column that is positioned on a side of a second surface of the packaging bag and is disposed in a direction crossing the packaging bag, a first pressing member that is positioned on a side of a first surface of the packaging bag, is disposed on an upstream side of the column in a transport direction, and presses the first surface of the packaging bag, and a second pressing member that is disposed on a downstream side of the column in the transport direction and presses the first surface of the packaging bag,
the first and second pressing members are independently movable in a direction opposite to a pressing direction,
relative positions of the column, the first pressing member, and the second pressing member are fixed, and
the dispersion mechanism and the packaging bag are movable relative to each other in the transport direction.

2. The dispensing inspection device according to claim 1, wherein a plurality of the first pressing members and a plurality of the second pressing members are disposed.

3. The dispensing inspection device according to claim 1, wherein the first pressing member includes a first biasing member and is biased to the first surface of the packaging bag by the first biasing member, and
the second pressing member includes a second biasing member and is biased to the first surface of the packaging bag by the second biasing member.

4. The dispensing inspection device according to claim 1, wherein the first pressing member includes a first wheel that is supported by a first axle and a first frame that supports the first axle to allow the first axle to be rotatable, and
the second pressing member includes a second wheel that is supported by a second axle and a second frame that supports the second axle to allow the second axle to be rotatable.

5. The dispensing inspection device according to claim 1, wherein the first pressing member includes a first shaft, a first distal end member that is fixed to the first shaft, and a first coil spring that is mounted on the first shaft and presses the first distal end member, and
the second pressing member includes a second shaft, a second distal end member that is fixed to the second shaft, and a second coil spring that is mounted on the second shaft and presses the second distal end member.

6. The dispensing inspection device according to claim 1, wherein the column is a spiral column.

7. The dispensing inspection device according to claim 1, wherein the column, the first pressing member, and the second pressing member are disposed at a position where the column, the first pressing member, and the second pressing member apply tension to the packaging bag.

8. The dispensing inspection device according to claim 1, wherein the imaging unit includes a first imaging unit that is disposed on the side of the first surface of the packaging bag, and a second imaging unit that is disposed on the side of the second surface of the packaging bag.

9. The dispensing inspection device according to claim 1, wherein the transport passage is provided with a drive unit that moves the packaging bag.

10. The dispensing inspection device according to claim 1, wherein the dispersion mechanism and the packaging bag are capable of reciprocating relative to each other in the transport direction.

11. The dispensing inspection device according to claim 10, wherein a forward movement speed and a backward movement speed are different from each other during reciprocation.

12. The dispensing inspection device according to claim 11, wherein the backward movement speed is lower than the forward movement speed.

13. A dispensing inspection method comprising:
a transport step of transporting a packaging bag in which drugs are packaged on a transport passage;
a dispersion step of dispersing the drugs packaged in the packaging bag on the transport passage by a dispersion mechanism;
an imaging step of imaging the drugs packaged in the packaging bag on the transport passage; and
an inspection step of inspecting the drugs on the basis of an image of the drugs taken in the imaging step,
wherein the dispersion mechanism includes a column that is positioned on a side of a second surface of the packaging bag and is disposed in a direction crossing the packaging bag, a first pressing member that is positioned on a side of a first surface of the packaging bag, is disposed on an upstream side of the column in a transport direction, and presses the first surface of the packaging bag, and a second pressing member that is disposed on a downstream side of the column in the transport direction and presses the first surface of the packaging bag,
the first and second pressing members are independently movable in a direction opposite to a pressing direction,
relative positions of the column, the first pressing member, and the second pressing member are fixed, and
the dispersion mechanism and the packaging bag are movable relative to each other in the transport direction.

14. The dispensing inspection method according to claim 13, wherein the column is a spiral column.

15. The dispensing inspection method according to claim 13, wherein the dispersion mechanism and the packaging bag are capable of reciprocating relative to each other in the transport direction.

16. The dispensing inspection method according to claim 15, wherein a forward movement speed and a backward movement speed are different from each other during reciprocation.

17. The dispensing inspection method according to claim 16, wherein the backward movement speed is lower than the forward movement speed.

* * * * *